(12) United States Patent
Ikeda

(10) Patent No.: US 12,430,742 B2
(45) Date of Patent: Sep. 30, 2025

(54) INSPECTION SYSTEM AND INSPECTION METHOD

(71) Applicant: OMRON CORPORATION, Kyoto (JP)

(72) Inventor: Yasuyuki Ikeda, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 349 days.

(21) Appl. No.: 17/928,564

(22) PCT Filed: Mar. 8, 2021

(86) PCT No.: PCT/JP2021/008906
§ 371 (c)(1),
(2) Date: Nov. 29, 2022

(87) PCT Pub. No.: WO2021/250956
PCT Pub. Date: Dec. 16, 2021

(65) Prior Publication Data
US 2023/0252616 A1    Aug. 10, 2023

(30) Foreign Application Priority Data

Jun. 12, 2020 (JP) .................................. 2020-102219

(51) Int. Cl.
*G06T 7/00* (2017.01)
*G02B 5/08* (2006.01)
(Continued)

(52) U.S. Cl.
CPC .............. *G06T 7/0004* (2013.01); *G02B 5/08* (2013.01); *G02B 27/30* (2013.01); *G06T 7/97* (2017.01); *H04N 23/56* (2023.01); *H04N 23/71* (2023.01)

(58) Field of Classification Search
CPC . G06T 2207/10016; G06T 2207/30108; G06T 7/586; G06T 2207/10141;
(Continued)

(56) References Cited

U.S. PATENT DOCUMENTS

| 2002/0168787 A1 | 11/2002 | Noguchi et al. |
| 2003/0179369 A1 | 9/2003 | Feldman et al. |

(Continued)

FOREIGN PATENT DOCUMENTS

| CN | 101013028 A | 8/2007 |
| CN | 102630299 A | 8/2012 |

(Continued)

OTHER PUBLICATIONS

International Search Report for PCT/JP2021/008906 dated May 11, 2021.

(Continued)

*Primary Examiner* — Jose L Couso
(74) *Attorney, Agent, or Firm* — Sughrue Mion, PLLC

(57) ABSTRACT

An inspection system includes: a light emitting device configured to illuminate a target object; a collimator lens arranged between the light emitting device and the target object; and an imaging device configured to image the target object. The light emitting device is capable of changing a light emission position. The inspection system further includes an image analysis unit configured to generate an analysis image in which a value of each pixel corresponds to a normal direction of a surface of the target object appearing in the pixel, by analyzing a plurality of captured images obtained individually from a plurality of times of imaging where the light emission positions are different from each other. As a result, time and effort in adjustment for inspection can be reduced, and defect detection accuracy is improved.

10 Claims, 20 Drawing Sheets

(51) Int. Cl.
  *G02B 27/30* (2006.01)
  *H04N 23/56* (2023.01)
  *H04N 23/71* (2023.01)

(58) Field of Classification Search
  CPC ............. G06T 2207/10152; G06T 7/00; G06T 7/0001; G02B 21/002; G02B 21/125; G02B 21/082; G02B 26/00; H04N 23/74; H04N 7/18; H04N 23/90; G01N 21/8806; G01N 21/95684; G01N 21/8816; G01N 21/94; G01N 21/8835; G01N 21/8845; G01N 21/8851; G01N 2021/8887; G01N 2021/8835; G01N 21/8918; G01N 21/9501; G01N 21/95638; G01N 2201/12; G01N 21/8809; G06V 10/00–26; G06V 10/40–46; G06V 10/70–75; G06V 10/627; G06V 10/764; G03F 7/70358
  See application file for complete search history.

(56) References Cited

U.S. PATENT DOCUMENTS

| | | | |
|---|---|---|---|
| 2004/0233411 A1* | 11/2004 | Shiraishi | G03F 7/70858 250/548 |
| 2007/0013903 A1 | 1/2007 | Furman et al. | |
| 2007/0019186 A1 | 1/2007 | Sung et al. | |
| 2007/0176927 A1 | 8/2007 | Kato et al. | |
| 2007/0206184 A1* | 9/2007 | Uto | G01N 21/4788 356/237.2 |
| 2007/0211242 A1 | 9/2007 | Okabe et al. | |
| 2008/0144023 A1* | 6/2008 | Shibata | G01N 21/4788 356/237.2 |
| 2010/0033080 A1 | 2/2010 | Yoneda | |
| 2013/0114078 A1 | 5/2013 | Honda et al. | |
| 2013/0128026 A1 | 5/2013 | Hirose | |
| 2013/0293879 A1* | 11/2013 | Honda | G01N 21/8851 356/237.4 |
| 2014/0372075 A1 | 12/2014 | Kojima et al. | |
| 2016/0123892 A1 | 5/2016 | Cauwenberghs et al. | |
| 2017/0115230 A1 | 4/2017 | Kurihara et al. | |
| 2018/0299386 A1 | 10/2018 | Masumura | |
| 2018/0348146 A1 | 12/2018 | Ando | |
| 2019/0186999 A1 | 6/2019 | Steffanson et al. | |
| 2019/0265170 A1 | 8/2019 | Kato et al. | |
| 2019/0265171 A1 | 8/2019 | Kato et al. | |
| 2019/0272630 A1 | 9/2019 | Inazumi et al. | |
| 2019/0277771 A1 | 9/2019 | Kato | |

FOREIGN PATENT DOCUMENTS

| | | | | |
|---|---|---|---|---|
| CN | 104977155 A | | 10/2015 | |
| CN | 106164653 A | | 11/2016 | |
| CN | 110186927 A | | 8/2019 | |
| CN | 110186928 A | | 8/2019 | |
| CN | 110231346 A | | 9/2019 | |
| CN | 110248056 A | | 9/2019 | |
| JP | 7-27709 A | | 1/1995 | |
| JP | 2000-105203 A | | 4/2000 | |
| JP | 2004212067 A | * | 7/2004 | ......... G01N 21/9501 |
| JP | 2005156516 A | * | 6/2005 | ....... G01N 21/95684 |
| JP | 2005-521064 A | | 7/2005 | |
| JP | 2007-240432 A | | 9/2007 | |
| JP | 2011-252841 A | | 12/2011 | |
| JP | 3197766 U | | 5/2015 | |
| JP | 5866586 B1 | | 1/2016 | |
| JP | 2017-533437 A | | 11/2017 | |
| JP | 2018-204994 A | | 12/2018 | |
| JP | 2019-144202 A | | 8/2019 | |
| JP | 2019-144203 A | | 8/2019 | |
| TW | 472132 B | * | 1/2002 | ......... G01N 21/9501 |
| WO | WO-2006126596 A1 | * | 11/2006 | ......... G01N 21/8803 |
| WO | 2007/026690 A1 | | 3/2007 | |
| WO | 2013/132913 A1 | | 9/2013 | |

OTHER PUBLICATIONS

Written Opinion for for PCT/JP2021/008906 dated May 11, 2021.
Communication dated Oct. 24, 2023 issued by the Japanese Intellectual Property Office in Japanese Application No. 2020-102219.
Jia Qian-Qian, et al., "Extraction of central positions of light stripe in sub-pixel in 3D surface measurement based 011 light sectioning method", Feb. 15, 2010, Optics and Precision Engineering, vol. 18, No. 2. (7 pages).
Ghislain Takam Tchendjou et al., "Detection, Location and Concealment of Defective Pixels in Image Sensors", Emerging Topics in Computing, Apr.-Jun. 2021, vol. 9, No. 2, pp. 664-679 (16 pages).
Chinese Office Action dated Aug. 8, 2024 in Application No. 202180037604.1.
Jia Qian-Qian, et al., "Extraction of central positions of light stripe in sub-pixel in 3D surface measurement based on light sectioning method", Feb. 15, 2010, Optics and Precision Engineering, vol. 18, No. 2. (7 pages).
Ghislain Takam Tchendjou et al., "Detection, Location and Concealment of Defective Pixels in Image Sensors", Emerging Topics in Computing, Feb. 27, 2020, vol. 9, No. 2, pp. 664-679 (16 pages).
Chinese Office Action dated May 29, 2025 in Application No. 202180037604.1.

* cited by examiner

INSPECTION SYSTEM AND INSPECTION METHOD

This Application is a National Stage of International Application No. PCT/JP2021/008906 filed Mar. 8, 2021, claiming priority based on Japanese Patent Application No. 2020-102219 filed Jun. 12, 2020, the contents of each of which being herein incorporated by reference in their entireties.

TECHNICAL FIELD

The present disclosure relates to an inspection system and an inspection method.

BACKGROUND ART

In a factory automation (FA) field and the like, it is known to image a target object having a glossy surface such as metal while illuminating the target object, and inspect an appearance of the object by using the obtained image.

As a method of illumination, parallel light coaxial illumination is known. By using the parallel light coaxial illumination, when a defect such as a fine flaw or gentle irregularities exists on the surface of the target object, a gradation distribution of a luminance corresponding to the defect appears in the image. Therefore, the presence or absence of the defect can be inspected by checking the density distribution.

Utility Model Registration No. 3197766 (PTL 1) discloses a reflection phase shift method. In the reflection phase shift method, a target object is irradiated with slit light while being shifted by one cycle. Stripes are seen in an image obtained by imaging, and a luminance change varies depending on the presence or absence of a defect. Therefore, the defect can be detected by checking the luminance change. For example, a maximum value and a minimum value of a luminance of an image for one cycle are obtained for each position on a surface of a captured inspection object, and a defect on the surface of the inspection object is detected on the basis of a difference image between a maximum value image obtained by collecting maximum values and a minimum value image obtained by collecting minimum values at each position on the surface of the inspection object.

U.S. Pat. No. 5,866,586 (PTL 2) discloses an inspection illumination apparatus including a filter means that forms a plurality of solid angle regions having different optical attributes as irradiation solid angles of light applied to each point of a target object. By using this inspection illumination apparatus, a shape, a size, and an inclination of the irradiation solid angle of light and the solid angle region having a specific optical attribute within the irradiation solid angle can be set substantially uniformly in the entire visual field. As a result, even a slight defect or the like can be detected under substantially the same detection condition.

CITATION LIST

Patent Literature

PTL 1: Utility Model Registration No. 3197766
PTL 2: U.S. Pat. No. 5,866,586

SUMMARY OF INVENTION

Technical Problem

In a case of using the parallel light coaxial illumination, it is necessary to install a target object such that an optical axis of parallel light is parallel to a normal direction of a surface of the target object. Therefore, it takes time and effort to adjust installation of the target object.

In a case of using the reflection phase shift method described in PTL 1, when a diffuse reflectance of the surface of the target object is large, a contrast of observed stripes decreases, and defect detection accuracy is deteriorated.

In a case of using the inspection illumination apparatus described in PTL 2, it takes time and effort to adjust the filter means according to reflection characteristics of a surface of a target object.

The present disclosure has been made in view of the above problems, and an object thereof is to provide an inspection system and an inspection method that can reduce time and effort in adjustment for inspection and have high defect detection accuracy.

Solution to Problem

According to an example of the present disclosure, an inspection system for inspecting a surface of a target object includes a light emitting device configured to illuminate the target object, a collimator lens arranged between the light emitting device and the target object, and an imaging device configured to image the target object. The light emitting device is capable of changing a light emission position. The inspection system further includes an image analysis unit configured to generate a first analysis image in which a value of each pixel corresponds to a normal direction of a surface of the target object appearing in the pixel, by analyzing a plurality of captured images obtained individually from a plurality of times of imaging where the light emission positions are different from each other.

According to the disclosure described above, in the first analysis image, a value of a pixel in which a defect such as irregularities or a flaw appears where the normal direction of the surface changes is different from values of other pixels. Therefore, the defect can be accurately detected by checking the first analysis image.

Furthermore, a relative positional relationship between the target object and the imaging device is only required to be set such that the luminance shows a peak at any of the plurality of light emission positions. Therefore, it does not take time and effort to adjust the installation of the target object as in PTL 1. Furthermore, since the filter means as described in PTL 2 is not provided, it is not necessary to take time and effort to adjust the filter means.

As described above, according to the inspection system having the above configuration, time and effort in adjustment for inspection can be reduced, and defect detection accuracy can be enhanced.

In the disclosure described above, a value of each pixel of the first analysis image indicates a phase of a waveform indicating a relationship between a luminance of the pixel and a light emission position in a plurality of captured images.

The phase of the waveform indicating the relationship between a luminance of the pixel and the light emission position depends on the normal direction of the surface of the target object appearing in the pixel. Therefore, according to the disclosure described above, the first analysis image can accurately represent a distribution of the normal direction of the surface of the target object.

In the disclosure described above, a value of each pixel of the first analysis image indicates a light emission position at which a luminance peaks in the waveform indicating the relationship between the luminance of the pixel and the light emission position in the plurality of captured images.

The light emission position at which a luminance peaks depends on the normal direction of the surface of the target object. Therefore, according to the disclosure described above, the first analysis image can accurately represent a distribution of the normal direction of the surface of the target object.

In the disclosure described above, the image analysis unit further generates a second analysis image by analyzing a plurality of captured images. A value of each pixel of the second analysis image is an amplitude of a waveform indicating a relationship between a luminance of the pixel and a light emission position in the plurality of captured images.

According to the disclosure described above, by checking the second analysis image, it is possible to accurately detect a stain of a substance that reduces a degree of regular reflection of light or a fine flaw on a surface of a target object made of glass.

In the disclosure described above, the light emitting device includes a plurality of light sources, and sequentially switches a light source to emit light among the plurality of light sources. The plurality of light sources are arranged on a plane perpendicular to an optical axis of the collimator lens or on a spherical surface centered on the optical axis. According to the disclosure described above, the light emitting device can easily change the light emission position.

In the disclosure described above, the image analysis unit further generates a composite image obtained by combining a plurality of captured images.

According to the disclosure described above, by checking the composite image, it is possible to accurately detect a defect such as low-contrast unevenness causing diffuse reflection, without being affected by irregularities on the surface of the target object.

In the disclosure described above, a distance between the light emission position and the collimator lens is greater than or equal to a focal distance of the collimator lens.

According to the disclosure described above, in a case where the distance between the light emission position and the collimator lens is the focal distance of the collimator lens, an irradiation condition on the surface of the target object can be made uniform. In a case where the distance between the light emission position and the collimator lens is longer than the focal distance of the collimator lens, a degree of freedom of an installation location of the imaging device increases.

In the disclosure described above, the inspection system further includes a half mirror arranged between the collimator lens and the target object. Light emitted from the light emitting device and transmitted through the collimator lens is reflected by the half mirror to illuminate the target object. Light reflected by the target object is transmitted through the half mirror to be incident on the imaging device.

According to the disclosure described above, the imaging device can more easily image the target object irradiated with light from the light emitting device.

According to an example of the present disclosure, an inspection system for inspecting a surface of a target object includes a light emitting device configured to illuminate the target object, a collimator lens arranged between the light emitting device and the target object, and an imaging device configured to image the target object. The light emitting device is capable of changing a light emission position. The inspection system further includes an image analysis unit configured to generate an analysis image by analyzing a plurality of captured images obtained individually from a plurality of times of imaging where the light emission positions are different from each other. A value of each pixel of the analysis image is a feature quantity of a waveform indicating a relationship between a luminance of the pixel and a light emission position in the plurality of captured images.

According to the disclosure described above, a value of each pixel of the analysis image is a feature quantity of a waveform indicating a relationship between a luminance of the pixel and a light emission position in the plurality of captured images.

The waveform indicating the relationship between a luminance of the pixel and the light emission position changes according to a normal direction of a surface of the target object appearing in the pixel and a degree of regular reflection of light on the surface. Therefore, a distribution of the normal direction of the surface of the target object or a distribution of a degree of regular reflection of light on the surface of the target object can be grasped by checking the analysis image in which the feature quantity of the waveform is the value of the pixel. As a result, it is possible to accurately detect defects such as irregularities and a flaw that affect the normal direction of the surface, or a defect such as a stain and a flaw that affects the degree of regular reflection of light.

Furthermore, a relative positional relationship between the target object and the imaging device is only required to be set such that the luminance shows a peak at any of the plurality of light emission positions. Therefore, it does not take time and effort to adjust the installation of the target object as in PTL 1. Furthermore, since the filter means as described in PTL 2 is not provided, it is not necessary to take time and effort to adjust the filter means.

As described above, according to the inspection system having the above configuration, time and effort in adjustment for inspection can be reduced, and defect detection accuracy can be enhanced.

According to an example of the present disclosure, an inspection method for inspecting a surface of a target object includes imaging the target object while irradiating the target object with light emitted from a light emitting device and transmitted through a collimator lens. The imaging includes switching light emission positions in the light emitting device, and acquiring a plurality of captured images from a plurality of times of imaging where the light emission positions are different from each other. The inspection method further includes generating an analysis image in which a value of each pixel corresponds to a normal direction of a surface of the target object appearing in the pixel by analyzing the plurality of captured images.

According to this disclosure as well, it is possible to reduce time and effort in adjustment for inspection and to improve defect detection accuracy.

Advantageous Effects of Invention

According to the present disclosure, time and effort in adjustment for inspection can be reduced, and the defect detection accuracy can be enhanced.

BRIEF DESCRIPTION OF DRAWINGS

FIG. 14 is a view illustrating an example of a method of changing a light emission position in a light emitting device 10A, wherein FIGS. 14(a) to 14(g) illustrate captured images when seven light sources 101 arranged at Y=−3, −2, −1, 0, 1, 2, and 3 mm are simultaneously turned on, and FIGS. 14(h) to 14(n) illustrate captured images when seven light sources 101 arranged at X=−3, −2, −1, 0, 1, 2, and 3 mm are simultaneously turned on.

FIG. 15 is a view illustrating another example of the method of changing the light emission position in light emitting device 10A, wherein FIG. 15(a), FIG. 15(b), FIG. 15(c), FIG. 15(d), and FIG. 15(e) individually illustrate captured images when 21 light sources 101 arranged at Y=−3 to −1 mm, −2 to 0 mm, −1 to 1 mm, 0 to 2 mm, and 1 to 3 mm are simultaneously turned on, and FIG. 15(f), FIG. 15(g), FIG. 15(h), FIG. 15(i), and FIG. 15(j) individually illustrate captured images when 21 light sources 101 arranged at X=−3 to −1 mm, −2 to 0 mm, −1 to 1 mm, 0 to 2 mm, and 1 to 3 mm are simultaneously turned on.

FIG. 21 is a view illustrating an example of four lighting states of a light emitting device 10C, wherein FIG. 21(a) illustrates a first lighting state, FIG. 21(b) illustrates a second lighting state, FIG. 21(c) illustrates a third lighting state, and FIG. 21(d) illustrates a fourth lighting state.

DESCRIPTION OF EMBODIMENTS

Figure 1:
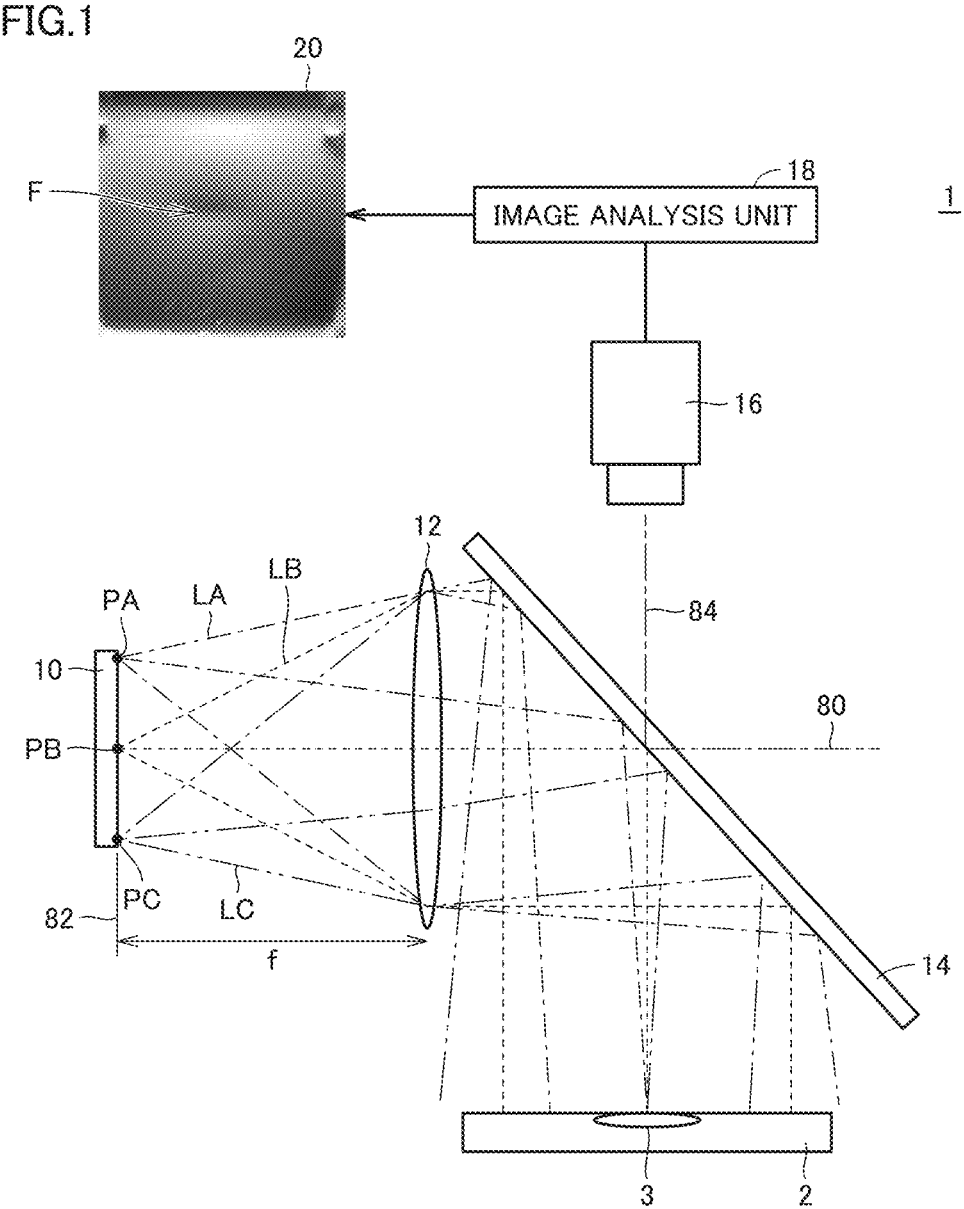
FIG. 1 is a schematic diagram illustrating an overall configuration of an inspection system 1 according to the present embodiment.

Embodiments of the present invention will be described in detail with reference to the drawings. Note that the same or corresponding parts in the drawings are denoted by the same reference numerals, and the description thereof will not be repeated.

§ 1 Application Example

With reference to FIG. 1, an application example of the present invention will be described. FIG. 1 is a schematic diagram illustrating an overall configuration of an inspection system 1 according to the present embodiment. Inspection system 1 inspects an inspection target region 3 on a surface of a target object 2. Target object 2 includes an object having a glossy surface such as metal or glass. Inspection system 1 is incorporated in a production line, for example, and inspects the presence or absence of a defect in inspection target region 3. Defects include flaws, irregularities, stains, adhesion of foreign particles, and the like.

As illustrated in FIG. 1, inspection system 1 includes a light emitting device 10, a collimator lens 12, an imaging device 16, and an image analysis unit 18 as main components. Further, inspection system 1 illustrated in FIG. 1 includes a half mirror 14.

Light emitting device 10 is a device for illuminating target object 2. Light emitting device 10 is capable of changing a light emission position. In the example illustrated in FIG. 1, light emitting device 10 can emit light from a plurality of light emission positions (including light emission positions PA, PB, and PC) on a virtual plane 82 perpendicular to an optical axis 80 of collimator lens 12. Light emission position PB is located on optical axis 80 of collimator lens 12.

Collimator lens 12 is arranged between light emitting device 10 and target object 2, on an optical path. In the example illustrated in FIG. 1, collimator lens 12 is arranged at a position separated from virtual plane 82 by a focal distance f. Therefore, light emitted from any one light emission position (for example, light emission positions PA, PB, or PC) arranged on virtual plane 82 passes through collimator lens 12 to become parallel light.

Half mirror 14 is arranged between collimator lens 12 and target object 2, on the optical path. As illustrated in FIG. 1, inspection target region 3 of target object 2 is substantially parallel to optical axis 80 of collimator lens 12. Therefore, in order to direct light emitted from light emitting device 10 toward target object 2, half mirror 14 is arranged such that an angle formed between optical axis 80 of collimator lens 12 and a reflecting surface is 45 degrees. This allows light emitted from light emitting device 10 and transmitted through collimator lens 12 to be reflected by half mirror 14 to illuminate target object 2.

As an example, imaging device 16 includes an imaging element partitioned into a plurality of pixels, such as a coupled charged device (CCD) or a complementary metal oxide semiconductor (CMOS) sensor, in addition to an optical system such as a lens. Imaging device 16 is arranged on a side opposite to target object 2 with respect to half mirror 14 such that inspection target region 3 of target object 2 is included in a visual field. Specifically, imaging device 16 is arranged such that an optical axis 84 of imaging device 16 is orthogonal to optical axis 80 of collimator lens 12, and an angle formed by optical axis 84 of imaging device 16 and half mirror 14 is 45 degrees. This allows light reflected by target object 2 to be transmitted through half mirror 14 and incident on imaging device 16. Imaging device 16 outputs image data (hereinafter, referred to as a "captured image") obtained by imaging, to image analysis unit 18.

Image analysis unit 18 analyzes a plurality of captured images obtained individually from a plurality of times of imaging where light emission positions are different from each other.

Light emitted from one light emission position in light emitting device 10 passes through collimator lens 12, is then reflected by half mirror 14, and illuminates inspection target region 3 of target object 2. Since collimator lens 12 is arranged between the light emission position and target object 2, an irradiation condition (a light amount, an irradiation angle, an irradiation solid angle, and the like) of each point in inspection target region 3 of target object 2 is uniform.

When the light emission position changes, the irradiation angle of light to each point of inspection target region 3 changes. In the example illustrated in FIG. 1, light LA emitted from light emission position PA is reflected by half mirror 14 after passing through collimator lens 12, and illuminates target object 2 from a left side of the page. Light LB emitted from light emission position PB is reflected by half mirror 14 after passing through collimator lens 12, and illuminates target object 2 along a vertical direction. Light LC emitted from light emission position PC is reflected by half mirror 14 after passing through collimator lens 12, and illuminates target object 2 from a right side of the page.

When target object 2 is an object having a glossy surface such as metal or glass, most of light applied to inspection target region 3 is regularly reflected. An amount of light (a regular reflection component) that is regularly reflected at each point of inspection target region 3 to be incident on imaging device 16 depends on the irradiation condition at the point and the normal direction of the point. Therefore, when the irradiation angle of light to each point of inspection target region 3 changes, the regular reflection component incident on imaging device 16 also changes. However, as described above, the irradiation condition of each point of inspection target region 3 is uniform. Therefore, at each point of inspection target region 3, a light emission position where the regular reflection component incident on imaging device 16 is maximized depends on the normal direction of the point. Therefore, in order to check a distribution of the normal direction of each point of inspection target region 3, image analysis unit 18 analyzes a change in luminance of each pixel for a plurality of captured images obtained individually from a plurality of times of imaging where the light emission positions are different from each other.

For example, in a case where inspection target region 3 is completely flat, that is, in a case where the normal direction of each point of inspection target region 3 is constant, a change in luminance of each pixel is uniform for the plurality of captured images. Whereas, when a defect such as irregularities or a flaw exists in a part of inspection target region 3, a normal direction of the defect is different from a normal direction of a part other than the defect. Therefore, in the plurality of captured images, a change in luminance of a pixel in which a defect appears is different from a change in luminance of a pixel in which a portion other than the defect appears. As described above, by analyzing a change in luminance of each pixel, a normal direction of the portion appearing in the pixel can be specified. Therefore, image analysis unit 18 generates an analysis image (hereinafter, referred to as a "normal line image 20") in which a value of each pixel corresponds to a normal direction of a surface of target object 2 appearing in the pixel, by analyzing the plurality of captured images. In normal line image 20 illustrated in FIG. 1, a value of a pixel in which a defect F appears where a gentle recess is formed is different from values of other pixels (that is, a pixel in which a flat portion without the defect appears). As a result, by checking normal line image 20, it is possible to accurately detect a defect such as irregularities or a flaw where a change occurs in the normal direction.

A relative positional relationship between target object 2 and imaging device 16 is only required to be set such that the luminance shows a peak at any of the plurality of light emission positions. Therefore, unlike the case of using the parallel light coaxial illumination, it is not necessary to take time and effort to adjust installation of target object 2.

Further, inspection system 1 according to the present embodiment does not include a filter means that forms a plurality of solid angle regions having different optical attributes as an irradiation solid angle of light applied to each point of the target object, as described in PTL 2. Therefore, it is not necessary to take time and effort to adjust the filter means.

As described above, according to inspection system 1 of the present embodiment, time and effort in adjustment for inspection can be reduced, and defect detection accuracy can be enhanced.

§ 2 Specific Example

<A. Specific Example 1 of Inspection System>

Figure 2:
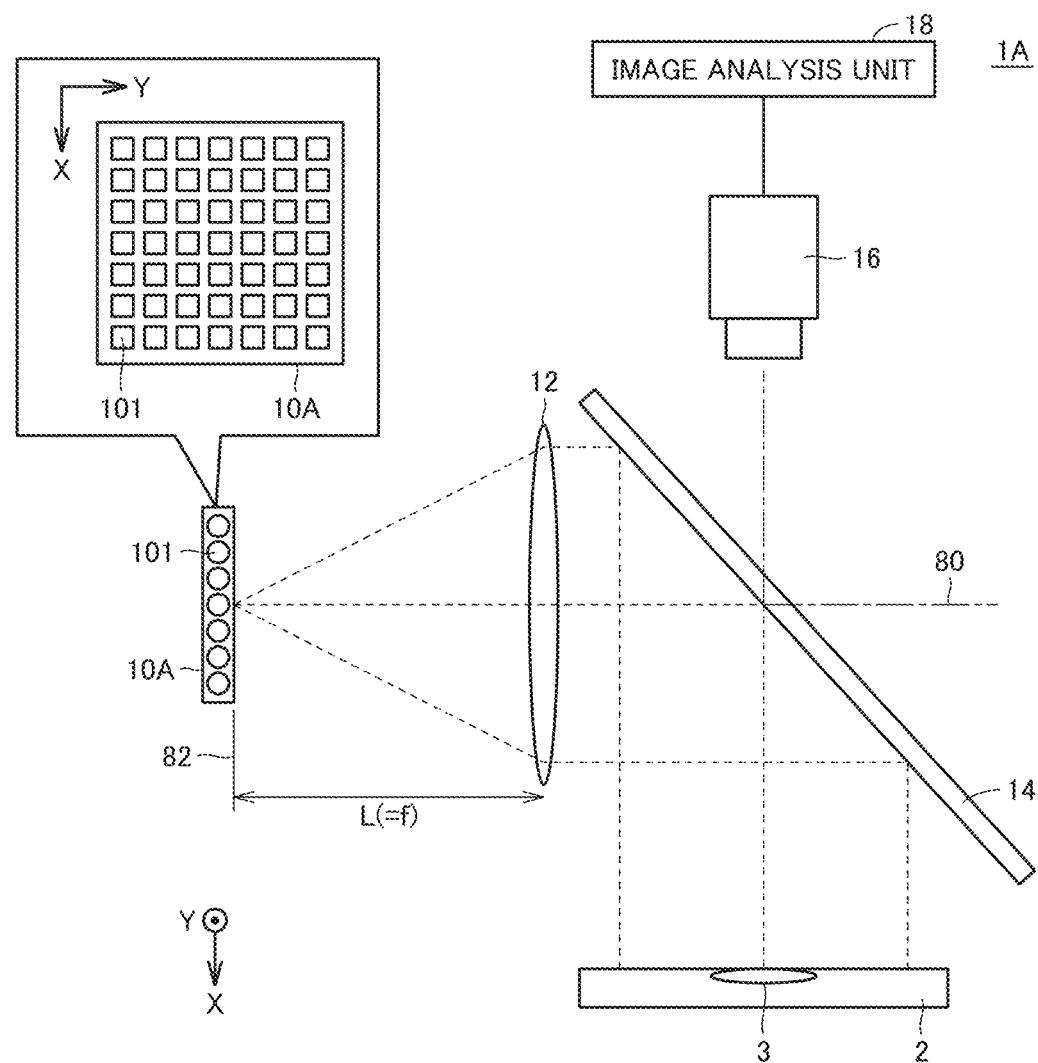
FIG. 2 is a schematic diagram illustrating a configuration of an inspection system 1A according to Specific Example 1.

FIG. 2 is a schematic diagram illustrating a configuration of an inspection system 1A according to Specific Example 1. As illustrated in FIG. 2, inspection system 1A includes a light emitting device 10A, collimator lens 12, half mirror 14, imaging device 16, and image analysis unit 18.

Light emitting device 10A includes a plurality of light sources 101. Light source 101 may be a point light source or a surface light source.

The plurality of light sources 101 are arranged on virtual plane 82 perpendicular to optical axis 80 of collimator lens 12. A distance L between virtual plane 82 and collimator lens 12 coincides with focal distance f of collimator lens 12.

In the example illustrated in FIG. 2, 49 light sources 101 are arranged in a matrix of seven rows in an X direction and seven columns in a Y direction. The X direction is a direction perpendicular to optical axis 80 of collimator lens 12 (a vertical direction in FIG. 2), and the Y direction is a direction perpendicular to the X direction and perpendicular to optical axis 80 of collimator lens 12.

Light emitting device 10A changes the light emission position by sequentially switching light source 101 to emit light among the plurality of light sources 101.

<B. Specific Example 2 of Inspection System>

Figure 3:
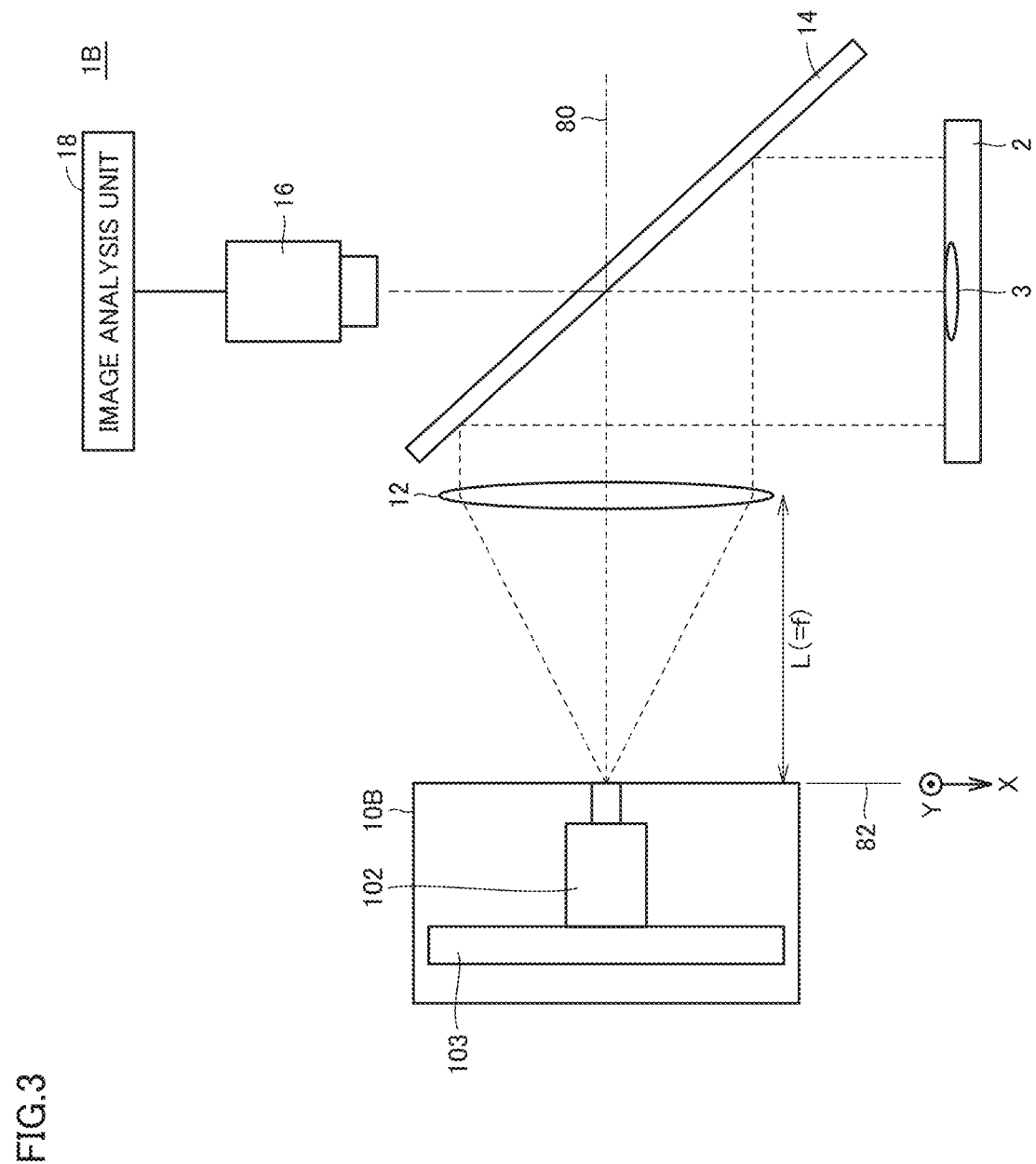
FIG. 3 is a schematic diagram illustrating a configuration of an inspection system according to Specific Example 2.

FIG. 3 is a schematic diagram illustrating a configuration of an inspection system according to Specific Example 2. As illustrated in FIG. 3, an inspection system 1B includes a light emitting device 10B, collimator lens 12, half mirror 14, imaging device 16, and image analysis unit 18.

Light emitting device 10B includes one light source 102 and an XY stage 103 that moves light source 102 in the X direction and the Y direction on virtual plane 82 perpendicular to optical axis 80 of collimator lens 12. Light source 102 may be a point light source or a surface light source.

Light emitting device 10B changes the light emission position by moving XY stage 103.

<C. Hardware Configuration of Image Analysis Unit>

Image analysis unit 18 typically has a structure according to a general-purpose computer architecture, and realizes various types of processing by a processor executing a program installed in advance.

Figure 4:
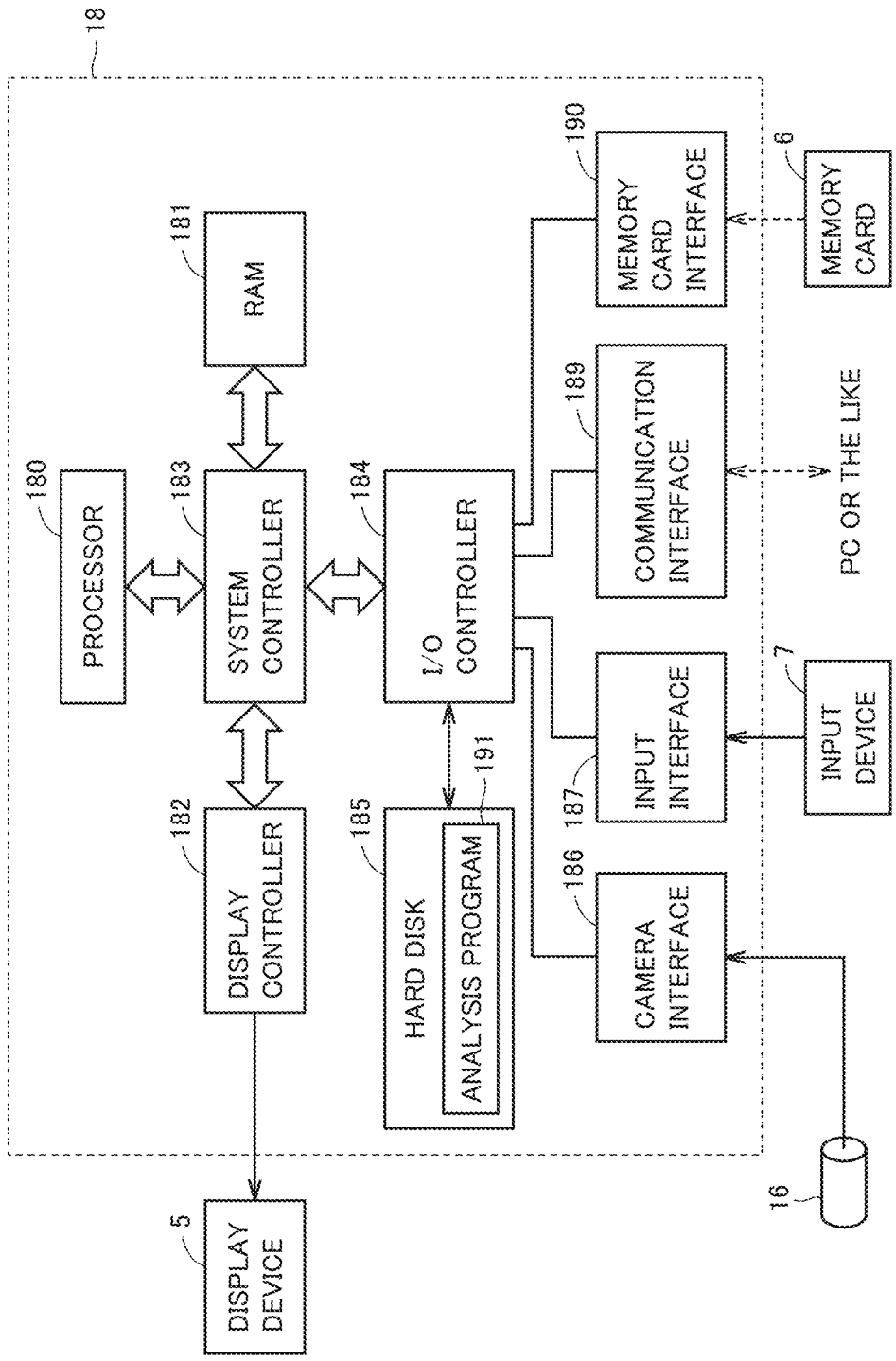
FIG. 4 is a diagram illustrating an example of a hardware configuration of an image analysis unit.

FIG. 4 is a diagram illustrating an example of a hardware configuration of the image analysis unit. As illustrated in FIG. 4, image analysis unit 18 includes a processor 180 such as a central processing unit (CPU) or a micro-processing unit (MPU), a random access memory (RAM) 181, a display controller 182, a system controller 183, an input output (I/O) controller 184, a hard disk 185, a camera interface 186, an input interface 187, a communication interface 189, and a memory card interface 190. These individual parts are connected to each other to be capable of communicating data, around system controller 183.

Processor 180 exchanges programs (codes) and the like with system controller 183, and executes the programs and the like in a predetermined order, to implement target arithmetic processing.

System controller 183 is connected to each of processor 180, RAM 181, display controller 182, and I/O controller 184 via a bus, exchanges data with each part, and manages the entire processing of image analysis unit 18.

RAM 181 is typically a volatile storage device such as a dynamic random access memory (DRAM), and holds a program read from hard disk 185, a captured image received from imaging device 16, a processing result for the captured image, work data, and the like.

Display controller 182 is connected to a display device 5, and outputs a signal for displaying various types of information to display device 5 according to an internal command from system controller 183. As an example, display device 5 includes a liquid crystal display, an organic electro luminescence (EL) display, an organic EL, or the like.

I/O controller 184 controls data exchange between with a recording medium or an external device connected to image analysis unit 18. More specifically, I/O controller 184 is connected to hard disk 185, camera interface 186, input interface 187, communication interface 189, and memory card interface 190.

Hard disk 185 is typically a nonvolatile magnetic storage device, and stores an analysis program 191 and the like to be executed by processor 180. Analysis program 191 to be installed in this hard disk 185 is distributed in a state of being stored in a memory card 6 or the like. Further, hard disk 185 stores captured images. Note that, instead of hard disk 185, a semiconductor storage device such as a flash memory or an optical storage device such as a digital versatile disk random access memory (DVD-RAM) may be adopted.

Camera interface 186 corresponds to an input unit that receives a captured image generated by capturing an image of target object 2, and mediates data transmission between processor 180 and imaging device 16. More specifically, an imaging instruction is outputted from processor 180 to imaging device 16 via camera interface 186. As a result, imaging device 16 images a subject, and outputs a generated captured image to processor 180 via camera interface 186.

Input interface 187 mediates data transmission between processor 180 and an input device 7 such as a keyboard, a mouse, a touch panel, or a dedicated console. That is, input interface 187 receives an operation command given by a user operating input device 7.

Communication interface 189 mediates data transmission between processor 180 and another personal computer (not illustrated), a server device, or the like. Communication interface 189 typically includes Ethernet (registered trademark), a universal serial bus (USB), or the like. Note that, as will be described later, instead of a form of installing a program stored in memory card 6 into image analysis unit 18, a program downloaded from a distribution server or the like may be installed into image analysis unit 18 via communication interface 189.

Memory card interface 190 mediates data transmission between processor 180 and memory card 6 which is a recording medium. That is, analysis program 191 and the like to be executed by image analysis unit 18 are distributed in a state of being stored in memory card 6, and memory card interface 190 reads analysis program 191 from memory card 6. In response to an internal command of processor 180, memory card interface 190 writes a captured image acquired by imaging device 16 and/or a processing result in image analysis unit 18 into memory card 6. Note that memory card 6 includes a general-purpose semiconductor storage device such as secure digital (SD), a magnetic recording medium such as a flexible disk, an optical recording medium such as a compact disk read only memory (CD-ROM), or the like.

In a case where a computer having a structure according to a general-purpose computer architecture as described above is used, an operating system (OS) for providing basic functions of the computer may be installed in addition to an application for providing functions according to the present embodiment. In this case, a program according to the present embodiment may execute processing among program modules provided as a part of the OS, by calling necessary modules in a predetermined order and/or timing. That is, there is case where the program itself according to the present embodiment does not include the modules as described above, and processing is executed in cooperation with the OS.

Furthermore, analysis program 191 according to the present embodiment may be provided by being incorporated in a part of another program. Also in this case, the program itself does not include modules included in another program to be combined as described above, and processing is executed in cooperation with such another program. That is, analysis program 191 according to the present embodiment may have a form of being incorporated in such another program.

Note that, alternatively, some or all of functions provided by executing analysis program 191 may be implemented as a dedicated hardware circuit.

<D. Image Analysis Method>

Figure 5:
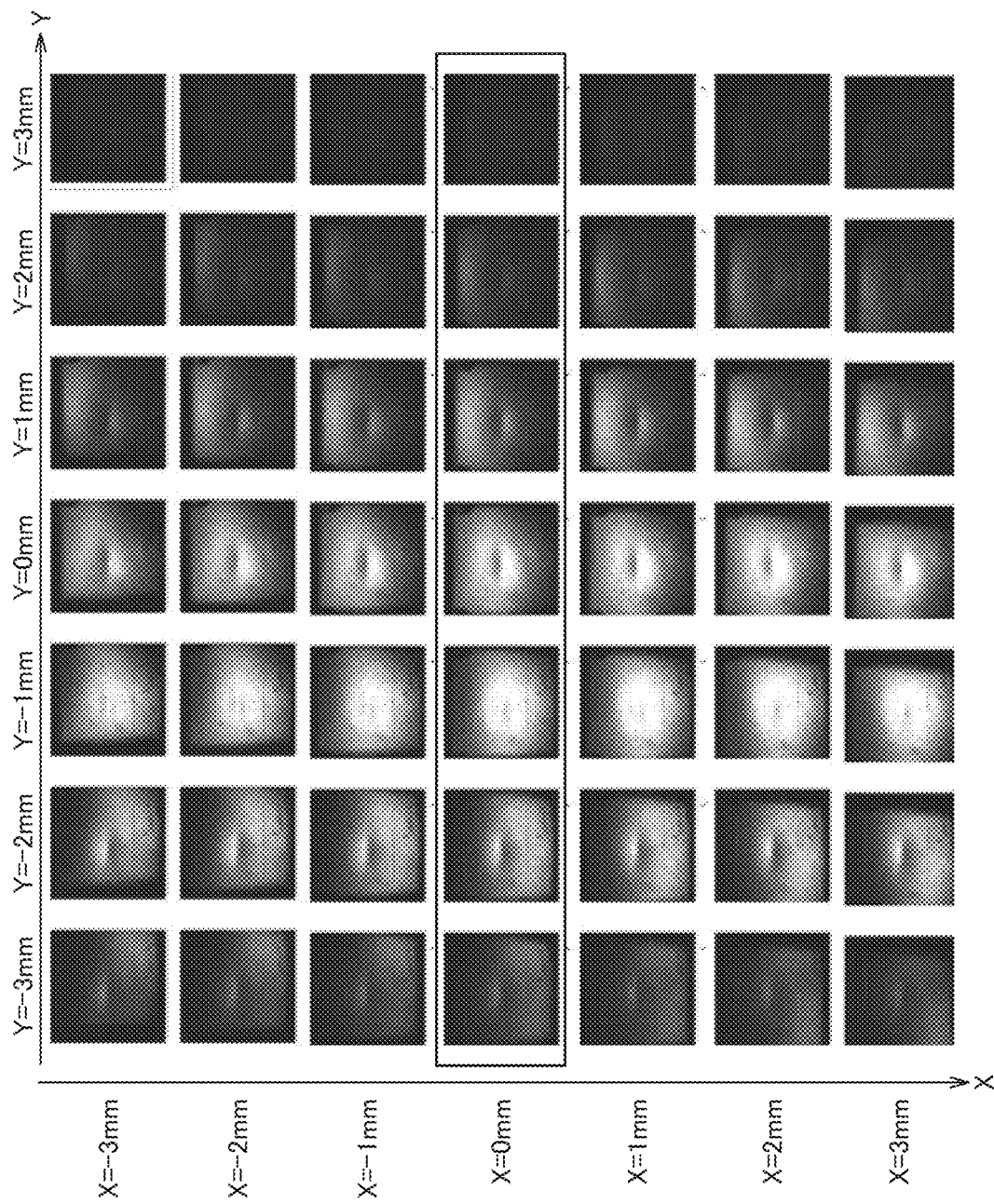
FIG. 5 is a view illustrating an example of a plurality of captured images obtained individually from a plurality of times of imaging where light emission positions are different from each other.

With reference to FIGS. 5 to 13, image analysis processing by image analysis unit 18 will be described. FIG. 5 is a view illustrating an example of a plurality of captured images obtained individually from a plurality of times of imaging where light emission positions are different from each other. FIG. 5 illustrates captured images obtained individually when light source 102 of light emitting device 10B is moved to 7×7=49 light emission positions of seven rows in the X direction and seven columns in the Y direction. Note that, a pitch of the light emission positions in the X direction is 1 mm, and a pitch of the light emission positions in the Y direction is 1 mm. A light emission position on optical axis 80 of collimator lens 12 is X=0 mm and Y=0 mm.

As illustrated in FIG. 5, a luminance of each pixel of the captured image is changed by making a difference in the light emission position. Image analysis unit 18 generates an analysis image by analyzing a change in luminance of each pixel. Therefore, image analysis unit 18 may select seven captured images for one row or one column having a large change in luminance from the 49 captured images, and analyze the selected seven captured images. In the example illustrated in FIG. 5, a change in luminance of each pixel in a case where the light emission position is changed in the Y direction is larger than that in a case where the light emission position is changed in the X direction. Therefore, image analysis unit 18 selects seven captured images (images surrounded by a solid line in FIG. 5) in which the light emission position is changed in the Y direction from among the 49 captured images. The selected seven captured images are images captured when light is emitted at light emission positions of X=0 mm and Y=−3, −2, −1, 0, 1, 2, and 3 mm. Note that selection of an image to be analyzed from among the plurality of captured images may be executed in accordance with a user's input. Alternatively, captured images of one row or one column having a largest change in luminance may be automatically selected from the plurality of captured images.

Figure 6:
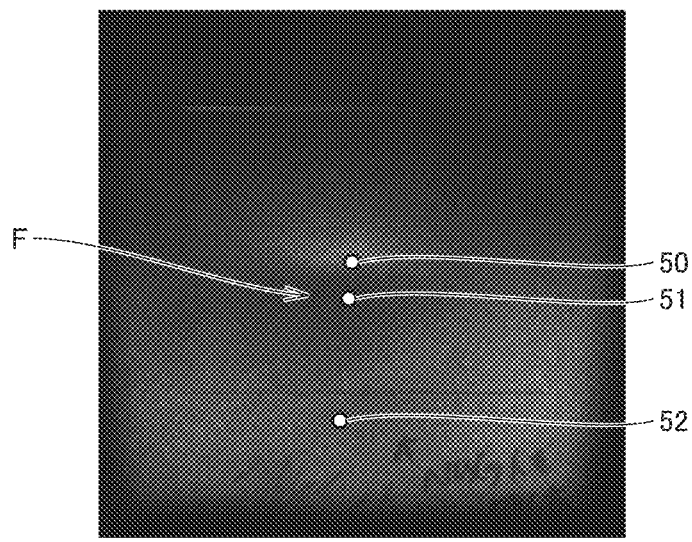
FIG. 6 is a view illustrating a captured image when light is emitted at a light emission position of X=0 mm and Y=−3 mm.

FIG. 6 is a view illustrating a captured image when light is emitted at a light emission position of X=0 mm and Y=−3 mm. As illustrated in FIG. 6, a luminance of each pixel of a captured image has a value corresponding to a normal direction of a surface of target object 2 appearing in the pixel. In the example illustrated in FIG. 6, the luminance increases in the order of a pixel 51, a pixel 52, and a pixel 50. Note that pixel 51 is a pixel in which defect F that is a gentle recess appears. Pixel 50 is a pixel in which a portion around defect F appears. Pixel 52 is a pixel in which a flat portion appears.

Figure 7:
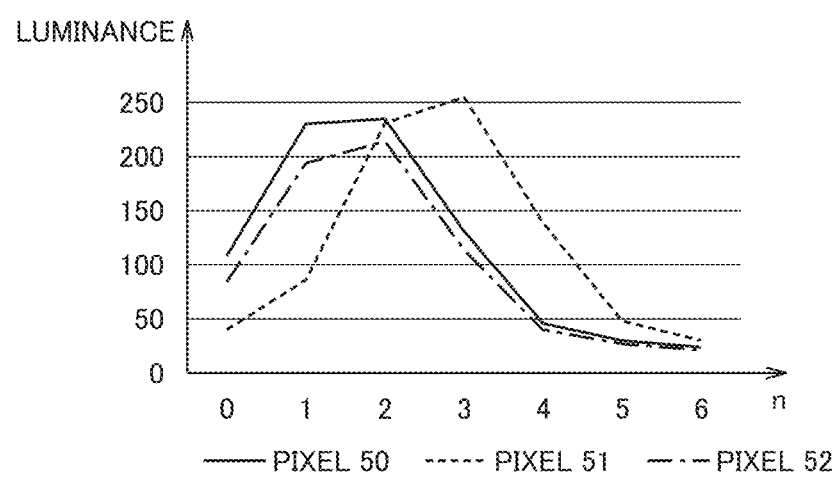
FIG. 7 is a graph illustrating changes in luminance of pixels 50 to 52 in seven selected captured images.

FIG. 7 is a graph illustrating changes in luminance of pixels 50 to 52 in the seven selected captured images. In FIG. 7, a horizontal axis represents a light emission position n when the captured image is captured. n=0 to 6 corresponds to light emission positions of Y=−3, −2, −1, 0, 1, 2, and 3 mm, respectively.

As illustrated in FIG. 7, changes in luminance in pixels 50 and 52 in which defect F does not appear are similar to each other. Whereas, a change in luminance in pixel 51 in which defect F appears is different from the changes in luminance in pixels 50 and 52 in which defect F does not appear. Specifically, a phase of a waveform indicating a relationship between a luminance and a light emission position in pixel 51 is different from a phase of a waveform indicating a relationship between a luminance and a light emission position in pixels 50 and 52. In other words, a light emission position at which the luminance is maximized in pixel 51 is different from a light emission position at which the luminance is maximized in pixels 50 and 52. This is because a normal direction of a surface is different between defect F that is a gentle recess and a portion other than defect F.

As described above, a phase of a waveform indicating a relationship between a luminance of each pixel and light emission position n depends on a normal direction of a surface of target object 2 appearing in the pixel. By using this point, image analysis unit 18 analyzes the selected seven captured images to generate a normal line image 20Y in which a value of each pixel corresponds to a normal direction of a surface of target object 2 appearing in the pixel.

Image analysis unit 18 performs discrete Fourier transform on the waveform indicating the relationship between a luminance of each pixel and light emission position n, to obtain a phase of a component of frequency 1. Specifically, for each pixel, image analysis unit 18 performs sine wave fitting using the following Equation (1) on the waveform indicating the relationship between a luminance of the pixel and light emission position n, and calculates a phase $\phi$. In Equation (1), N represents the number of captured images. For example, in a case where the seven captured images surrounded by the solid line illustrated in FIG. 5 are selected, N=7 is satisfied. In represents a luminance in the captured image when light is emitted at light emission position n.

[Formula 1]

Formula 1

$$\phi = \tan^{-1} \frac{\sum_{n=0}^{N-1}\left[I_n \sin\left(\frac{2\pi n}{N}\right)\right]}{\sum_{n=0}^{N-1}\left[I_n \cos\left(\frac{2\pi n}{N}\right)\right]} \quad \text{Equation (1)}$$

Image analysis unit 18 generates normal line image 20Y in which phase $\phi$ is a pixel value. Phase $\phi$ corresponds to a normal direction of a surface of target object 2 appearing in the pixel.

Figure 8:
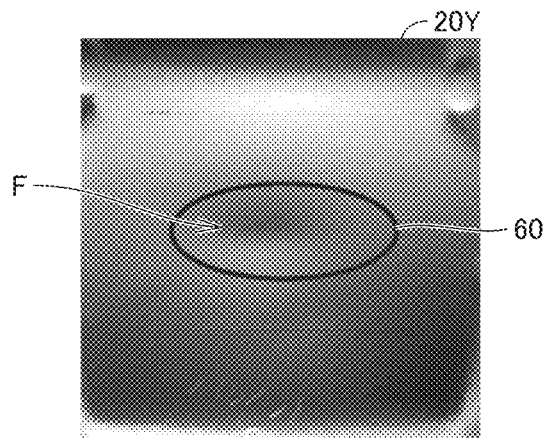
FIG. 8 is a view illustrating a normal line image 20Y generated from seven captured images surrounded by a solid line illustrated in FIG. 5.
Figure 9:
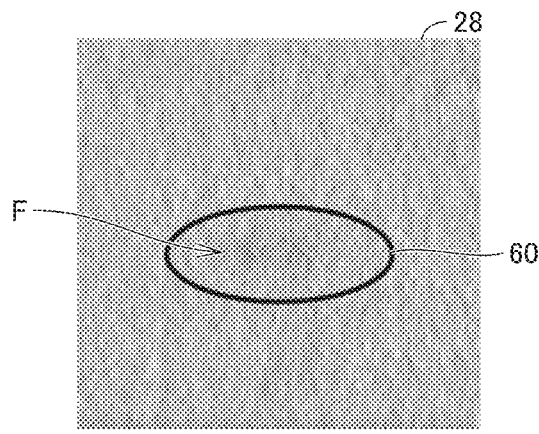
FIG. 9 is a view illustrating a difference image 28 generated using the reflection phase shift method described in PTL 1.

FIG. 8 is a view illustrating normal line image 20Y generated from the seven captured images surrounded by the solid line illustrated in FIG. 5. FIG. 9 is a view illustrating a difference image 28 generated using the reflection phase shift method described in PTL 1. Difference image 28 indicates a difference between a maximum value image obtained by collecting maximum values of individual pixels and a minimum value image obtained by collecting minimum values of individual pixels, when target object 2 is irradiated with slit light while being shifted by one cycle. In FIGS. 8 and 9, defect F that is a gentle recess appears in a region surrounded by a frame line 60.

As illustrated in FIG. 9, a difference is seen between a value of a pixel in which defect F appears and a value of a pixel in which a portion other than defect F appears. However, the difference is slight. This is because a noise component caused by diffuse reflection increases in difference image 28 due to a large diffuse reflectance of a surface of target object 2.

As illustrated in FIG. 8, in normal line image 20Y, a large difference is seen between the value of the pixel in which defect F appears and the value of the pixel in which the portion other than defect F appears. That is, defect F clearly appears in normal line image 20Y. Therefore, by checking normal line image 20Y, it is possible to accurately detect defect F, which is a gentle recess and is difficult to be detected by the inspection using the reflection phase shift method described in PTL 1.

Note that, as a value of each pixel of normal line image 20Y, image analysis unit 18 may use a value indicating light emission position n at which a luminance peaks in the waveform indicating a relationship between the luminance of the pixel and light emission position n in the plurality of captured images, instead of phase ¢ calculated by Equation (1). Also in this case, the value of each pixel of normal line image 20Y corresponds to the normal direction of the surface of target object 2 appearing in the pixel.

Image analysis unit 18 may generate another analysis image in addition to normal line image 20Y or instead of normal line image 20Y. For example, image analysis unit 18 may calculate an amplitude of the waveform indicating the relationship between a luminance of each pixel and light emission position n, and generate an analysis image (hereinafter, referred to as a "direct reflection image") in which the amplitude is a value of each pixel.

The amplitude of the waveform is larger as a regular reflection component of light applied to the surface of target object 2 is more (in other words, as a diffusely reflected component is less). In order for regular reflection light to be incident on imaging device 16, it is necessary for the light emission position in light emitting device 10, the normal direction of the surface, and optical axis 84 of imaging device 16 to satisfy predetermined conditions. For this reason, in a pixel in which a surface with a large amount of a regularly reflected component of irradiated light appears, a change in luminance is large when the light emission position is changed. As a result, the amplitude increases. On the contrary, in a pixel in which a surface having a large amount of a diffusely reflected component in irradiated light appears, a change in luminance when the light emission position is changed is small. As a result, the amplitude decreases. Therefore, a direct reflection image having the amplitude as the value of each pixel indicates a distribution of a degree of regular reflection of light on a surface of target object 2 appearing in the image.

Specifically, image analysis unit 18 calculates an amplitude A of the waveform indicating the relationship between a luminance of each pixel and light emission position n according to the following Equation (2). Image analysis unit 18 generates a direct reflection image having the calculated amplitude A as a pixel value.

[Formula 2]

Formula 2

$$A = \sqrt{\left(\sum_{n=0}^{N-1} I_n \sin\left(\frac{2\pi n}{N}\right)\right)^2 + \left(\sum_{n=0}^{N-1} I_n \cos\left(\frac{2\pi n}{N}\right)\right)^2} \quad \text{Equation (2)}$$

Figure 10:
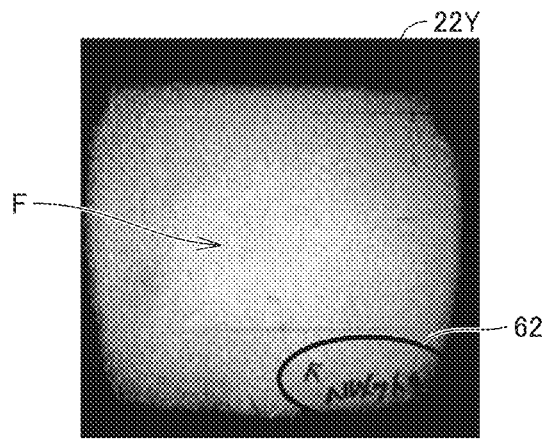
FIG. 10 is a view illustrating a direct reflection image 22Y generated from the seven captured images surrounded by the solid line illustrated in FIG. 5.

FIG. 10 is a view illustrating a direct reflection image 22Y generated from the seven captured images surrounded by the solid line illustrated in FIG. 5. In direct reflection image 22Y illustrated in FIG. 10, a change in pixel value caused by defect F, which is a gentle recess, is not observed as compared with normal line image 20Y illustrated in FIG. 8. This is because there is no difference between a degree of regular reflection of light at defect F and a degree of regular reflection of light at a portion other than defect F.

In a region surrounded by a frame line 62 of direct reflection image 22Y illustrated in FIG. 10, text formed by a marking pen can be confirmed. In the portion to which ink of the marking pen adheres, the degree of regular reflection of light decreases. Therefore, a value of a pixel in which the portion appears becomes small in direct reflection image 22Y. Whereas, in normal line image 20Y illustrated in FIG. 8, a portion to which ink of the marking pen adheres is not confirmed. This is because the ink lightly adheres to the surface of target object 2, so that the normal direction of the surface of target object 2 is not affected.

As described above, when a stain of a substance (for example, ink) that reduces the degree of regular reflection of light attaches to the surface of target object 2, the stain can be accurately detected by checking direct reflection image 22Y.

In the examples of FIGS. 5 to 10, image analysis unit 18 generates normal line image 20Y and direct reflection image 22Y from the seven captured images in which the light emission position has been changed in the Y direction. However, image analysis unit 18 may generate a normal line image and a direct reflection image from seven captured images in which the light emission position has been changed in the X direction.

Furthermore, image analysis unit 18 may generate a composite image obtained by combining a plurality of captured images obtained individually from a plurality of times of imaging where the light emission positions are different from each other. Specifically, image analysis unit 18 calculates a value B represented by the following Equation (3) for each pixel. Image analysis unit 18 generates a composite image having the calculated value B as a pixel value.

[Formula 3]

Formula 3

$$B = \sum_{n=0}^{N-1} I_n \quad \text{Equation (3)}$$

Figure 11:
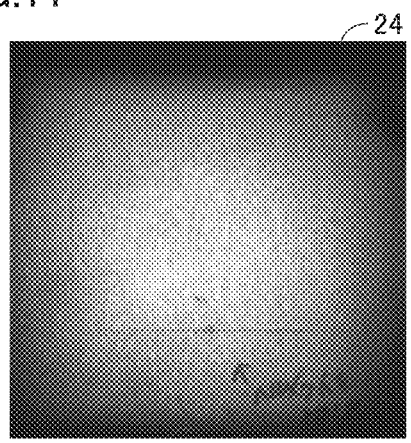
FIG. 11 is a view illustrating a composite image 24 obtained by combining a plurality of captured images.

FIG. 11 is a view illustrating a composite image 24 obtained by combining a plurality of captured images. FIG. 11 illustrates composite image 24 obtained by combining the 49 captured images illustrated in FIG. 5. Composite image 24 coincides with an image captured when light is simultaneously emitted at all light emission positions. By checking composite image 24, it is possible to accurately detect a defect such as low-contrast unevenness causing diffuse reflection, without being affected by irregularities on the surface of target object 2. Note that, in a case of using light emitting device 10A illustrated in FIG. 2, composite image 24 may be acquired by imaging with all light sources 101 being simultaneously turned on.

As described above, an analysis image (a normal line image, a direct reflection image, or a composite image) generated by analyzing a plurality of captured images obtained individually from a plurality of times of imaging where the light emission positions are different from each other is effective for detecting a defect. The analysis image used for inspection is appropriately selected from the normal line image, the direct reflection image, and the composite image according to a type of a defect to be detected.

The direct reflection image is effective not only for a stain of a substance that reduces a degree of regular reflection of light, but also for detection of a fine flaw on a surface of target object 2 made of glass, for example.

Figure 12:
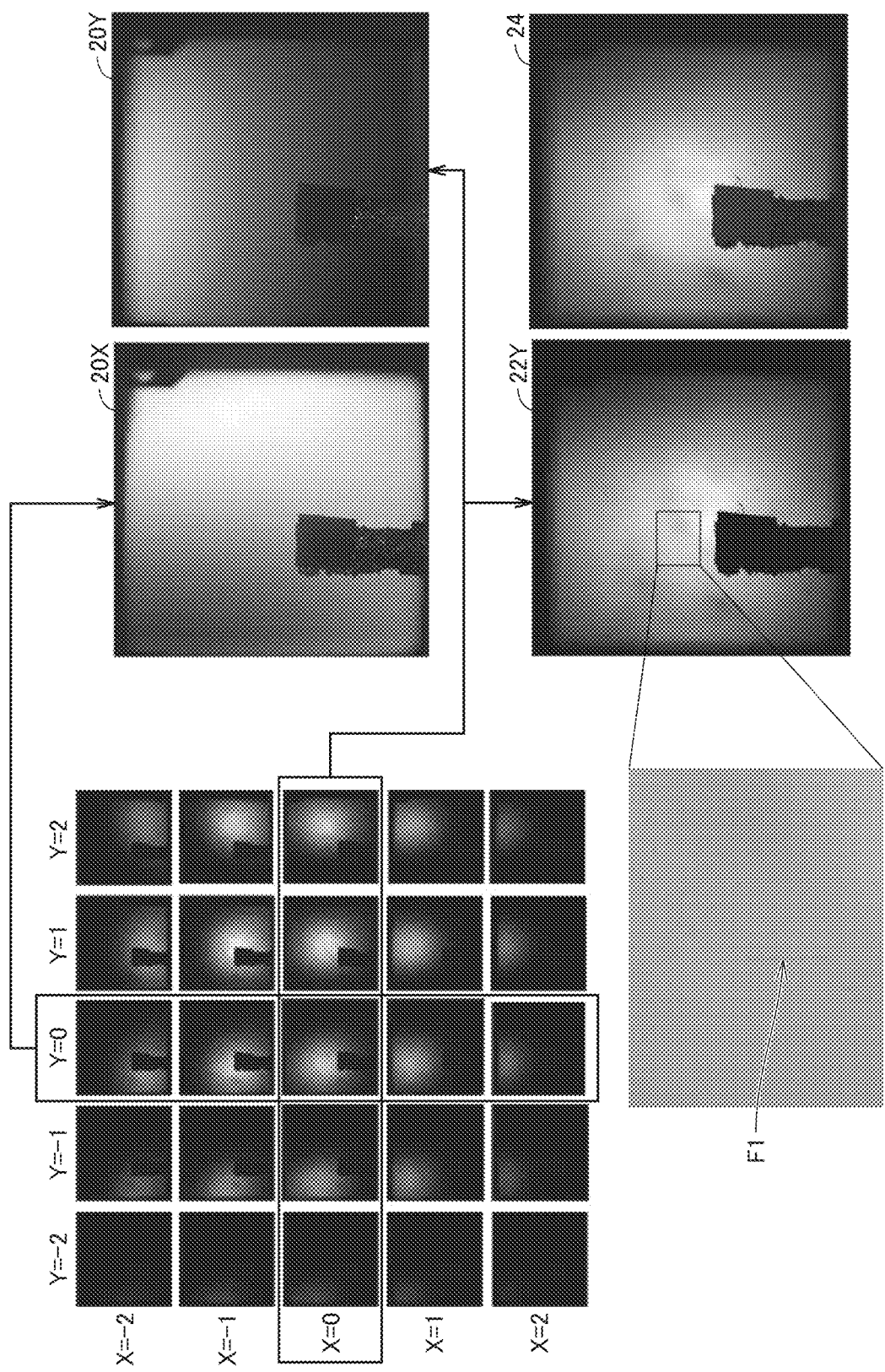
FIG. 12 is a view illustrating 25 captured images obtained individually from 25 times of imaging where the light emission positions are different from each other, and normal line images 20X and 20Y, direct reflection image 22Y, and composite image 24 generated from these captured images.

FIG. 12 is a view illustrating 25 captured images obtained individually from 25 times of imaging where the light emission positions are different from each other, and normal line images 20X and 20Y, direct reflection image 22Y, and composite image 24 generated from these captured images. FIG. 12 illustrates captured images obtained individually when light source 102 of light emitting device 10B is moved to 5×5=25 light emission positions of five rows in the X direction and five columns in the Y direction. Normal line image 20X is generated from five captured images when light is emitted at light emission positions of Y=0 mm and X=−2, −1, 0, 1, and 2 mm. Normal line image 20Y and direct reflection image 22Y are generated from five captured images when light is emitted at light emission positions of X=0 mm and Y=−2, −1, 0, 1, and 2 mm. Composite image 24 is generated from 25 captured images.

As illustrated in FIG. 12, by enlarging a part of direct reflection image 22Y, a defect F1 which is a fine flaw formed on the surface of target object 2 made of glass is confirmed.

Whereas, even if normal line images 20X and 20Y and composite image 24 are enlarged, defect F1 cannot be clearly confirmed. As described above, direct reflection image 22Y is effective for detecting a fine flaw on the surface of target object 2 made of glass.

Image analysis unit 18 may generate another analysis image by executing image processing on a normal line image and a direct reflection image.

Figure 13:
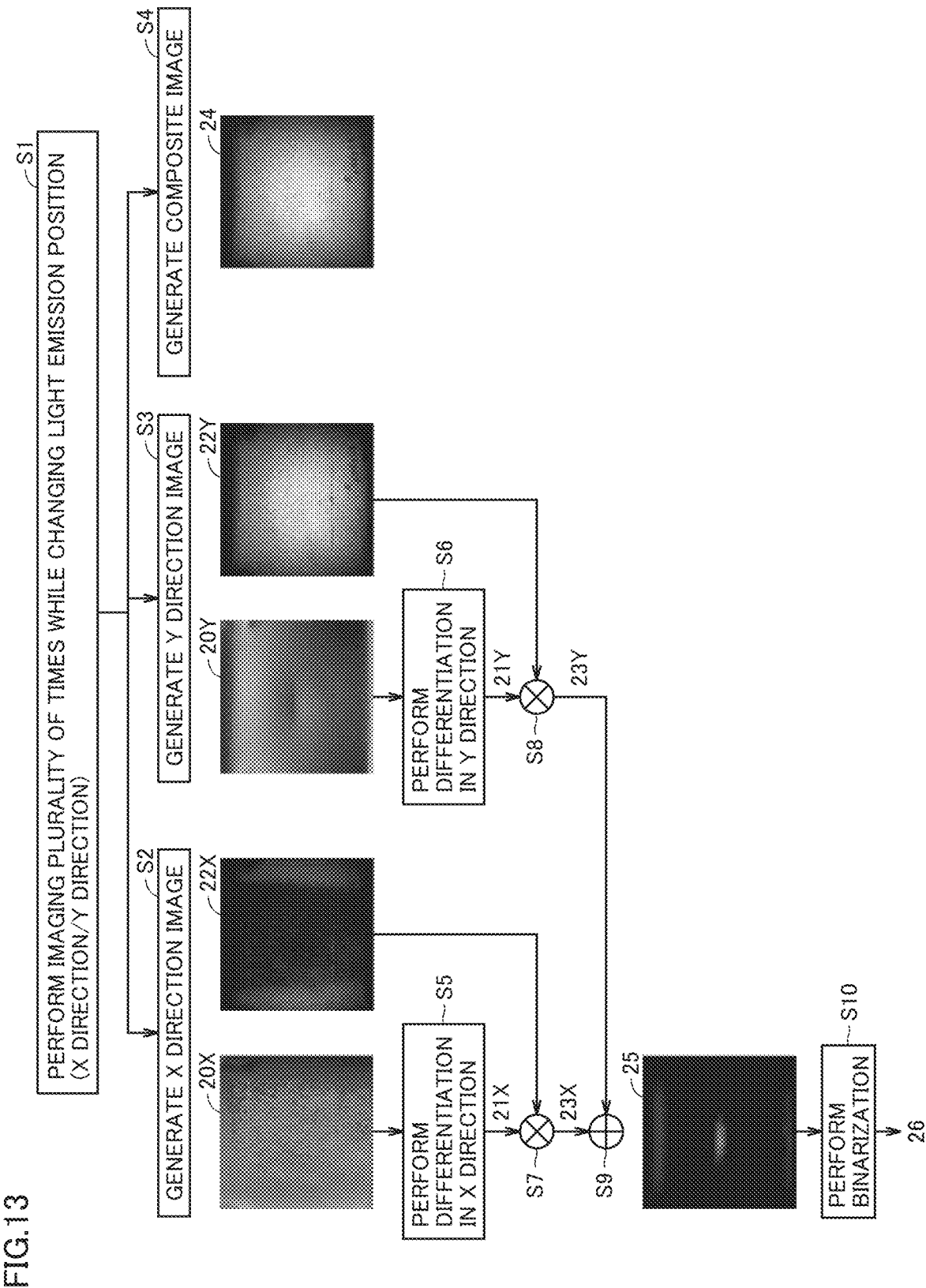
FIG. 13 is a view illustrating an example of a flow of processing of generating an analysis image.

FIG. 13 is a view illustrating an example of a flow of processing of generating an analysis image. As illustrated in FIG. 13, image analysis unit 18 acquires a plurality of captured images obtained by performing imaging a plurality of times while changing the light emission position in the X direction and the Y direction (step S1).

Next, image analysis unit 18 generates normal line image 20X and a direct reflection image 22X by analyzing a plurality of captured images when the light emission position is changed in the X direction (step S2). Furthermore, image analysis unit 18 generates normal line image 20Y and direct reflection image 22Y by analyzing a plurality of captured images when the light emission position is changed in the Y direction (step S3). Image analysis unit 18 generates composite image 24 by combining a plurality of captured images when the light emission position is changed in the X direction and the Y direction (step S4).

Next, image analysis unit 18 generates a differential image 21X by applying a differential filter in the X direction to normal line image 20X (step S5). Further, image analysis unit 18 generates a differential image 21Y by applying a differential filter in the Y direction to normal line image 20Y (step S6).

Next, image analysis unit 18 generates an image 23X by multiplying differential image 21X and direct reflection image 22X (step S7). Further, image analysis unit 18 generates an image 23Y by multiplying differential image 21Y and direct reflection image 22Y (step S7).

Next, image analysis unit 18 generates an irregularity image 25 by adding image 23X and image 23Y (step S9). Thereafter, image analysis unit 18 performs binarization processing on irregularity image 25 to generate a binary image 26 (step S10).

In the example illustrated in FIG. 13, among normal line images 20X and 20Y, differential images 21X and 21Y, direct reflection images 22X and 22Y, images 23X and 23Y, composite image 24, irregularity image 25, and binary image 26, an analysis image to be used for inspection is selected according to a type of a defect to be detected.

For example, in a case of a defect having an irregular shape, a normal direction is different between the defect and a portion other than the defect. Therefore, the defect can be accurately detected by using normal line images 20X and 20Y. Alternatively, in a case of a defect having an irregular shape, the normal direction changes steeply at a boundary between the defect and a portion other than the defect. Therefore, the defect can be accurately detected by using differential images 21X and 21Y.

Depending on a surface state of target object 2, a change in luminance in a captured image when the light emission position is changed in the X direction may be greatly different from a change in luminance in a captured image when the light emission position is changed in the Y direction. For example, in a case of target object 2 in which a hairline is formed on the surface, a change in luminance in the captured image when the light emission position is changed in the X direction is greatly different from a change in luminance in the captured image when the light emission position is changed in the Y direction. In such a case, an influence of the hairline is excluded by adding images 23X and 23Y generated respectively by multiplying differential images 21X and 21Y and direct reflection images 22X and 22Y. That is, only a change in normal direction due to the defect is reflected in a value of each pixel of irregularity image 25. Consequently, even in target object 2 having a hairline formed on the surface, a defect having an irregular shape can be accurately detected by using irregularity image 25. Alternatively, also when binary image 26 generated by binarizing irregularity image 25 is used, a defect having an irregular shape can be accurately detected.

<E. Method of Changing Light Emission Position of Light Emitting Device 10A>

In a case of using light emitting device 10A (see FIG. 2) including the plurality of light sources 101, light emitting device 10A changes the light emission position by switching light source 101 to be turned on among the plurality of light sources 101. For example, light emitting device 10A turns on only one light source 101 among the plurality of light sources 101, and sequentially switches light source 101 to be turned on. Alternatively, light emitting device 10A may simultaneously turn on at least two light sources 101 among the plurality of light sources 101, and sequentially switch light sources 101 to be simultaneously turned on.

Figure 14:
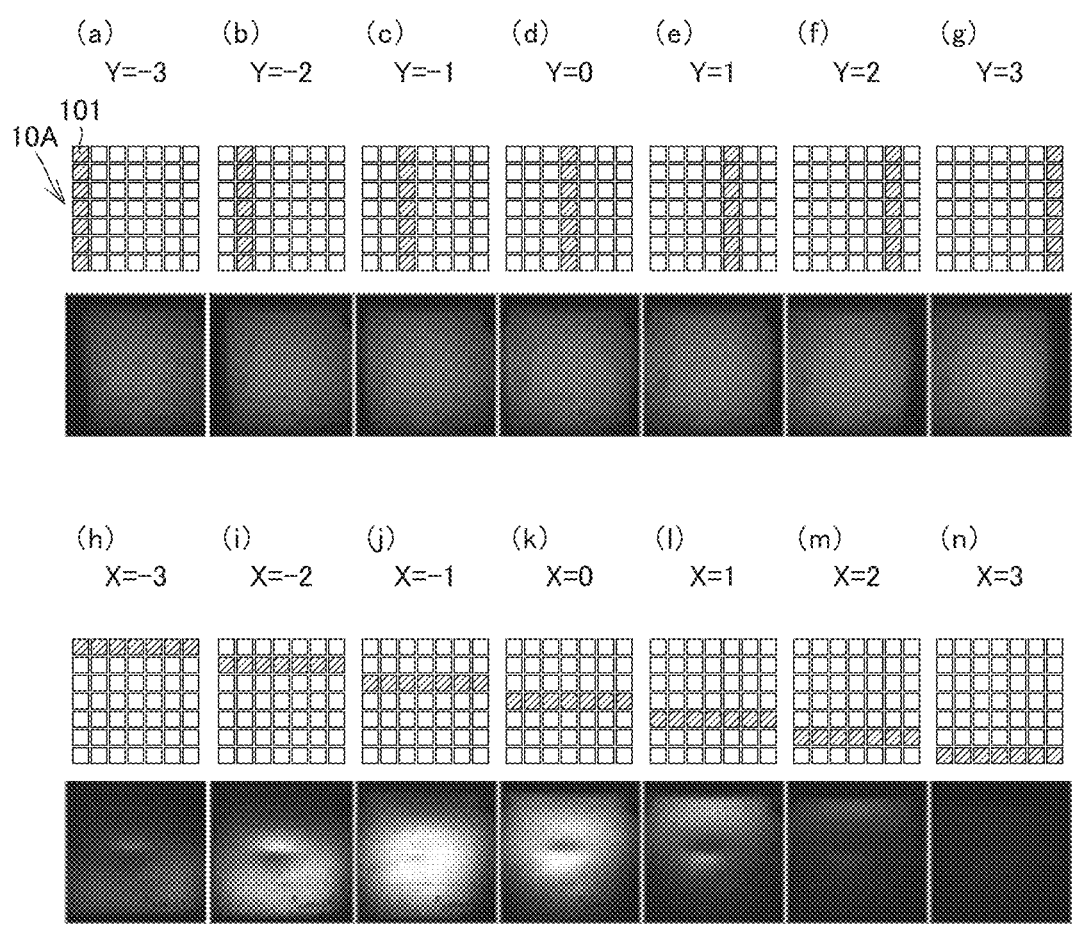

FIG. 14 is a view illustrating an example of a method of changing a light emission position in light emitting device 10A. As illustrated in FIG. 14, light emitting device 10A simultaneously turns on seven light sources 101 for one row arranged along the X direction or one column arranged along the Y direction. In FIG. 14, (a) to (g) illustrate captured images when seven light sources 101 arranged at Y=−3, −2, −1, 0, 1, 2, and 3 mm are simultaneously turned on. In FIG. 14, (h) to (n) illustrate captured images when seven light sources 101 arranged at X=−3, −2, −1, 0, 1, 2, and 3 mm are simultaneously turned on.

Figure 15:
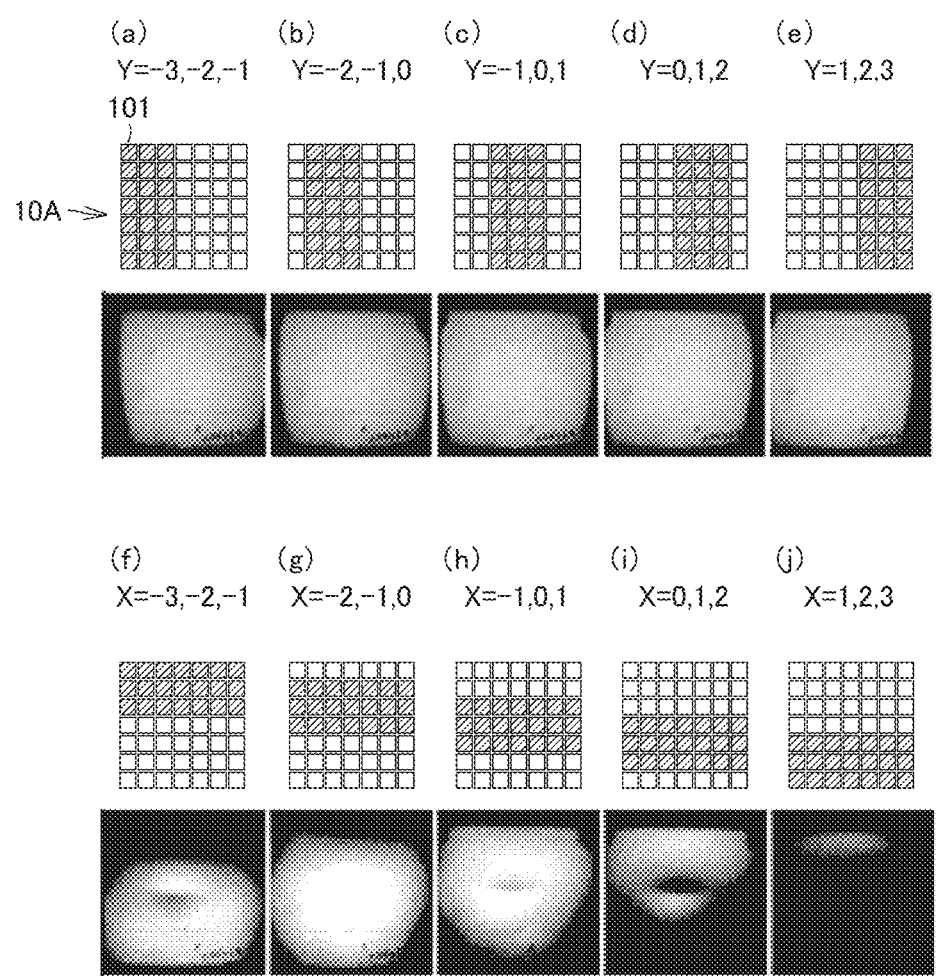

FIG. 15 is a view illustrating another example of the method of changing the light emission position in light emitting device 10A. As illustrated in FIG. 15, light emitting device 10A simultaneously turns on 21 light sources 101 for three rows arranged along the X direction or three columns arranged along the Y direction. In FIG. 15, (a), (b), (c), (d), and (e) individually illustrate captured images when 21 light sources 101 arranged at Y=−3 to −1 mm, −2 to 0 mm, −1 to 1 mm, 0 to 2 mm, and 1 to 3 mm are simultaneously turned on. In FIG. 15, (f), (g), (h), (i), and (j) individually illustrate captured images when 21 light sources 101 arranged at X=−3 to −1 mm, −2 to 0 mm, −1 to 1 mm, 0 to 2 mm, and 1 to 3 mm are simultaneously turned on.

As illustrated in FIGS. 14 and 15, a luminance of the entire captured image varies according to the number of light sources 101 to be simultaneously turned on, and the number of captured images to be obtained also varies. Therefore, the number of light sources 101 to be simultaneously turned on may be selected according to a surface state of target object 2 and a type of a defect to be detected.

<F. Arrangement Location of Imaging Device 16>

Normal line images 20X and 20Y are generated using regular reflection light at each point of inspection target region 3 of target object 2. Therefore, imaging device 16 preferably receives regular reflection light when light is emitted in at least one light emission position among the plurality of light emission positions, for each point of inspection target region 3.

Figure 16:
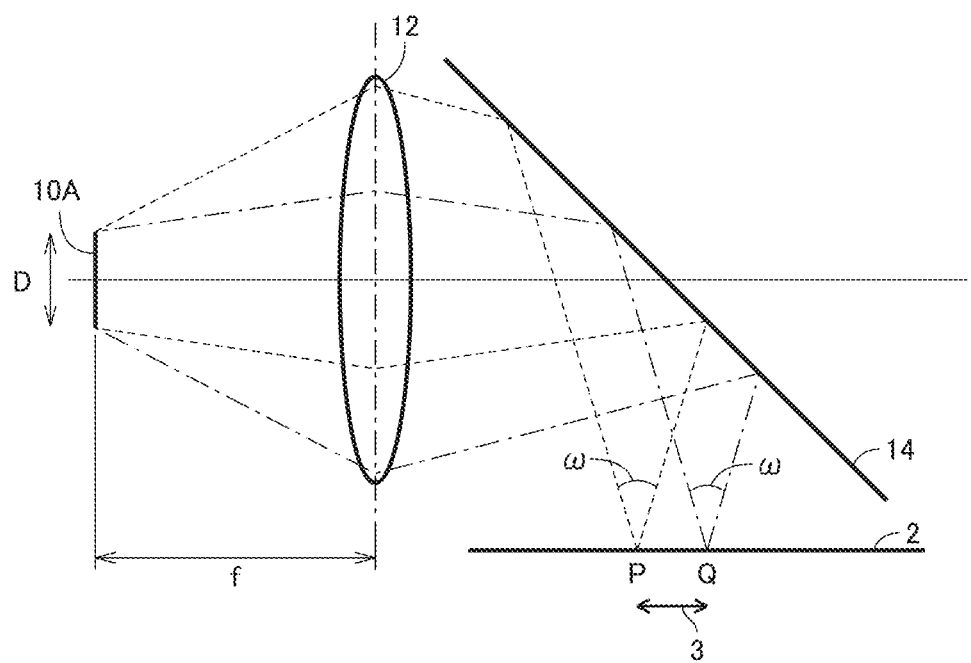
FIG. 16 is a view illustrating a stereoscopic irradiation angle at each point in an inspection target region.

FIG. 16 is a view illustrating a stereoscopic irradiation angle at each point in an inspection target region. FIG. 16 illustrates an irradiation solid angle ω at end points P and Q of inspection target region 3 when all light sources 101 of light emitting device 10A are turned on. Irradiation solid angle ω is expressed by the following Equation (4) using a length D of light emitting device 10A in a direction perpendicular to optical axis 80 of collimator lens 12 and focal distance f. ω=a tan (D/f) Equation (4)

Since collimator lens 12 is arranged between light source 102 and target object 2, irradiation solid angle ω at each point of inspection target region 3 is the same.

Figure 17:
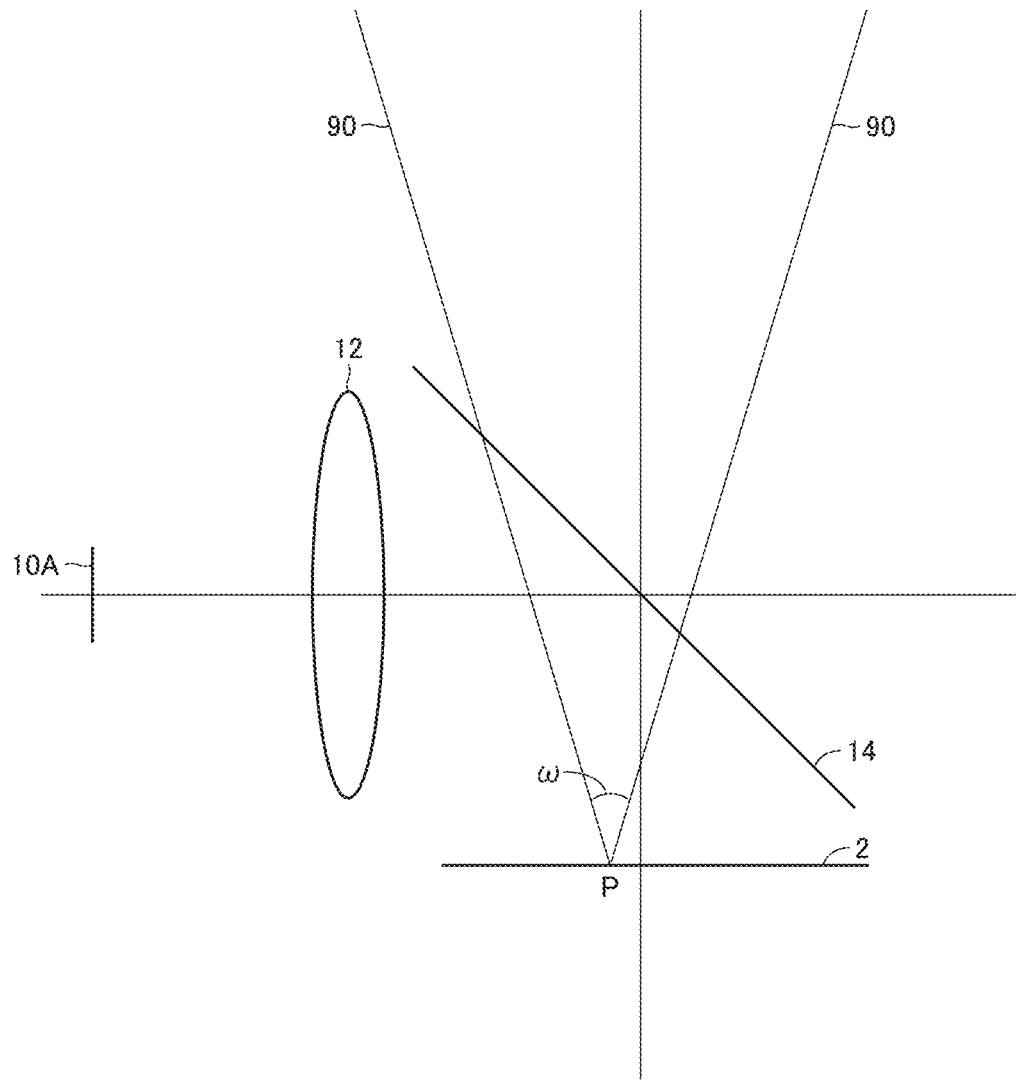
FIG. 17 is a view illustrating a luminous flux 90 of regular reflection light at an end point P of an inspection target region 3.
Figure 18:
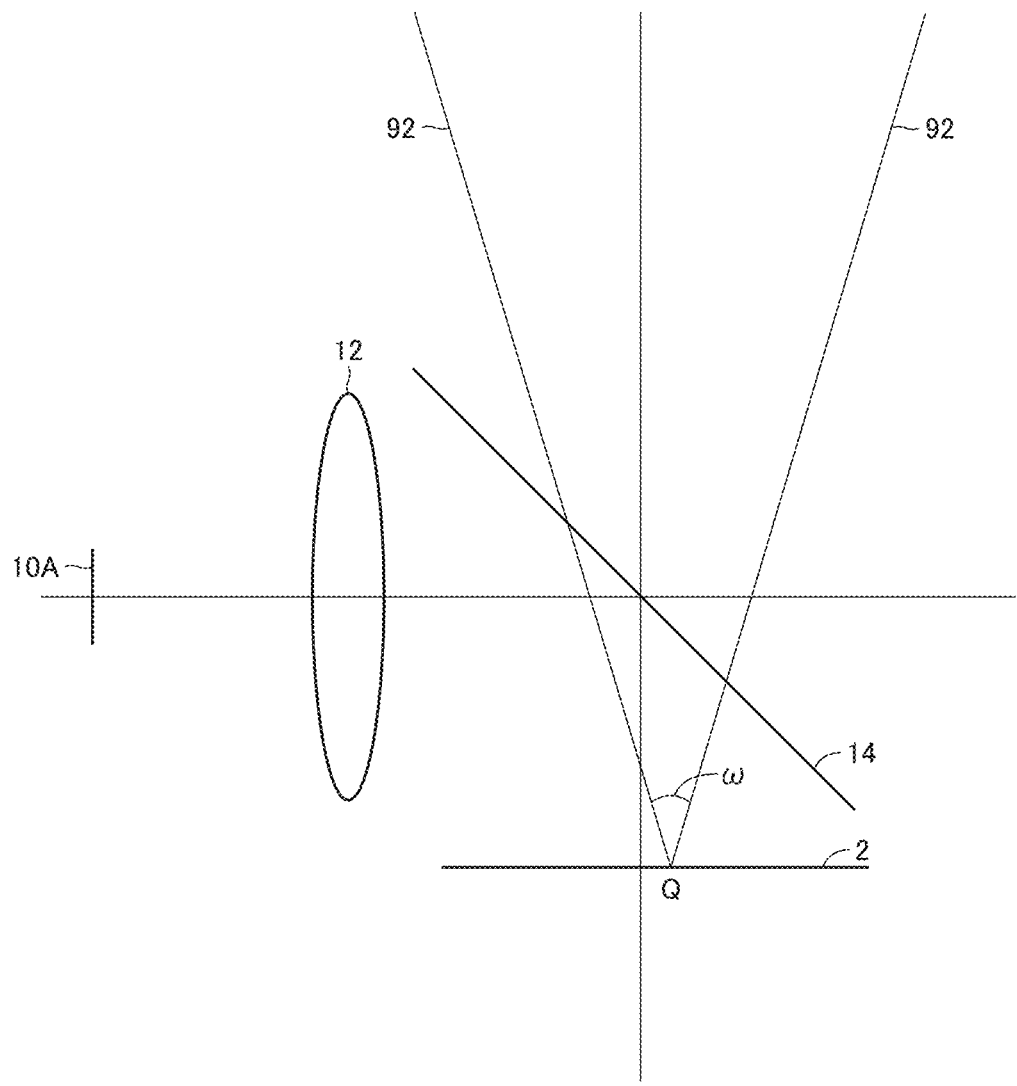
FIG. 18 is a view illustrating a luminous flux 92 of regular reflection light at an end point Q of inspection target region 3.

FIG. 17 is a view illustrating a luminous flux 90 of regular reflection light of end point P of inspection target region 3. FIG. 18 is a view illustrating a luminous flux 92 of regular reflection light of end point Q of inspection target region 3. FIGS. 17 and 18 illustrate luminous fluxes of regular reflection light when all light sources 101 of light emitting device 10A are turned on. As illustrated in FIGS. 17 and 18, luminous fluxes 90 and 92 of regular reflection light have the same solid angle as irradiation solid angle ω. When imaging device 16 is arranged in a passage region of luminous flux 90, imaging device 16 can receive regular reflection light of end point P when any light source 101 is turned on. When imaging device 16 is arranged in a passage region of luminous flux 92, imaging device 16 can receive regular reflection light of end point Q when any light source 101 is turned on.

Figure 19:
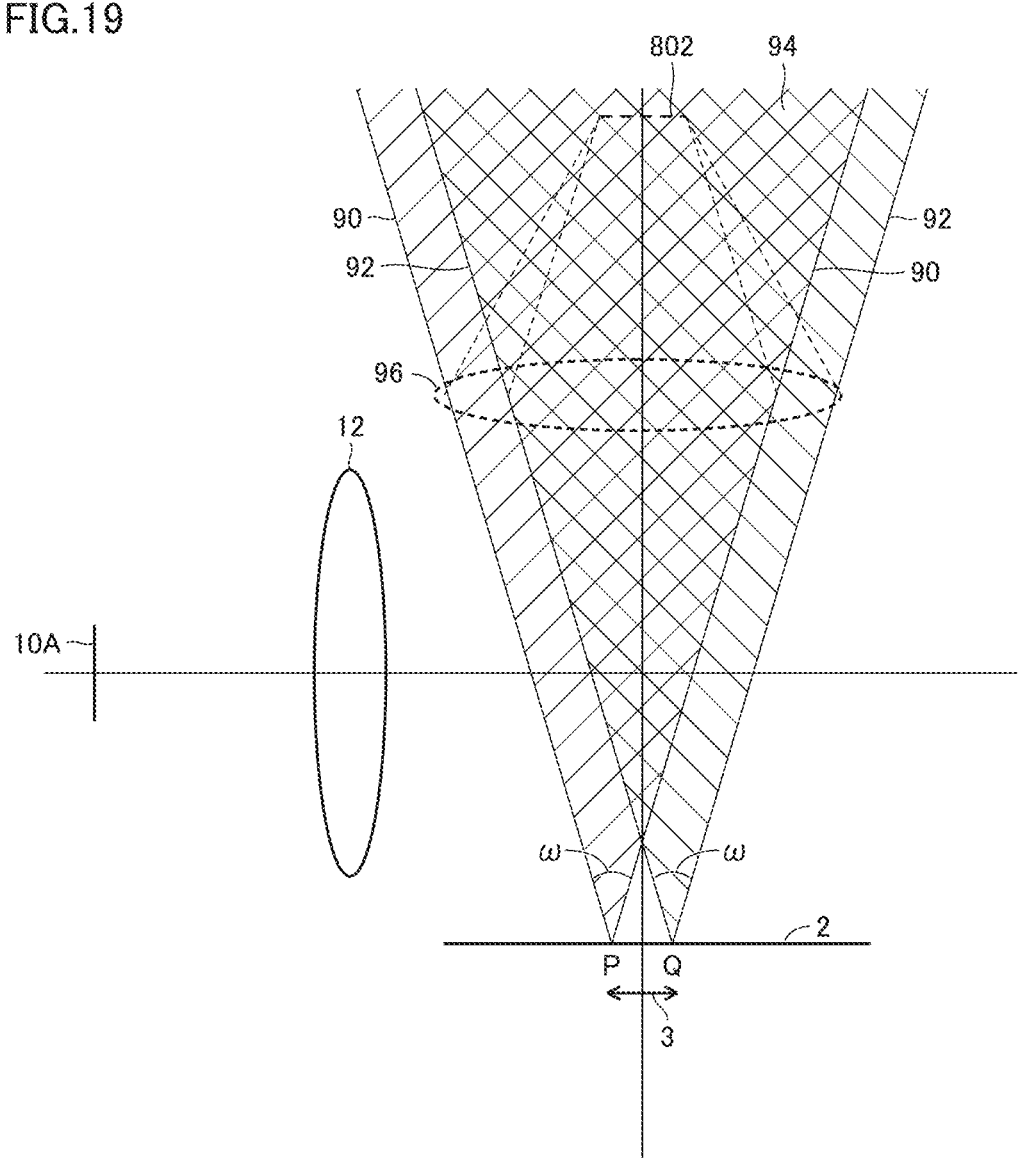
FIG. 19 is a view illustrating an arrangement region of an imaging device 16.

FIG. 19 is a view illustrating an arrangement region of imaging device 16. In a case where an optical system included in imaging device 16 is a pinhole lens, imaging device 16 is arranged in a region 94 where luminous flux 90 of regular reflection light of end point P and luminous flux 92 of regular reflection light of end point Q overlap with each other. As a result, imaging device 16 can receive regular reflection light when light is emitted in at least one light emission position among the plurality of light emission positions, for all points on inspection target region 3.

In a case where the optical system included in imaging device 16 is the same collimator lens as collimator lens 12, imaging device 16 is arranged such that a position of the optical system coincides with a position of a virtual image 96 of collimator lens 12, and a position of an imaging element of imaging device 16 coincides with a position of a virtual image 802 of light emitting device 10A. As a result, imaging device 16 can receive regular reflection light from all points on inspection target region 3.

In a case where a size of the optical system included in imaging device 16 is smaller than that of collimator lens 12 (for example, in a case where the optical system included in imaging device 16 is a pinhole lens), a light emission position at which a luminance peaks may change according to a position of a point of inspection target region 3. Therefore, even if inspection target region 3 is completely flat, a change (error) is observed in a value of each pixel in normal line images 20X and 20Y. However, a degree of change is smaller than a degree of change caused by a defect such as irregularities or a flaw. Therefore, the defect can be detected by checking normal line images 20X and 20Y or differential images 21X and 21Y obtained respectively by differentiating normal line images 20X and 20Y. Note that, as will be described later, the above error can be reduced by making distance L between light emitting devices 10A and 10B and collimator lens 12 larger than focal distance f of collimator lens 12.

In a case where the normal direction of inspection target region 3 is distributed within a certain error range, a region where imaging device 16 can be arranged is further limited according to the error range, in order to receive regular reflection light of each point of inspection target region 3.

In a case where imaging device 16 has a telecentric optical system, imaging device 16 may simply be arranged such that the telecentric optical system overlaps with region 94. Therefore, a degree of freedom of arrangement of imaging device 16 is increased.

<G. Action and Effect>

As described above, inspection system 1 (1A, 1B) inspects a surface of target object 2. Inspection system 1 (1A, 1B) includes light emitting device 10 (10A, 10B) configured to illuminate target object 2, collimator lens 12 arranged between light emitting device 10 (10A, 10B) and target object 2, and imaging device 16 configured to image target object 2. Light emitting device 10 (10A, 10B) is capable of changing a light emission position. Inspection system 1 (1A, 1B) further includes image analysis unit 18 configured to analyze a plurality of captured images obtained individually from a plurality of times of imaging where the light emission positions are different from each other. Image analysis unit 18 generates normal line image 20 (20X, 20Y) in which a value of each pixel corresponds to a normal direction of a surface of target object 2 appearing in the pixel.

In normal line image 20 (20X, 20Y), a value of a pixel in which a defect such as irregularities and a flaw appears where the normal direction of the surface changes is different from values of other pixels. As a result, the defect can be accurately detected by checking normal line image 20 (20X, 20Y).

Furthermore, a relative positional relationship between target object 2 and imaging device 16 is only required to be set such that a luminance shows a peak at any of the plurality of light emission positions. Therefore, it does not take time and effort to adjust a relative positional and orientational relationship between target object 2 and imaging device 16. Further, since inspection system 1 (1A, 1B) does not include the filter means as described in PTL 2, it is not necessary to take time and effort to adjust the filter means.

As described above, according to inspection system 1 (1A, 1B), time and effort in adjustment for inspection can be reduced, the defect detection accuracy can be enhanced.

A value of each pixel of normal line image 20 (20X, 20Y) indicates phase § of a waveform indicating a relationship between a luminance of the pixel and a light emission position in the plurality of captured images. As illustrated in FIG. 7, phase ¢ depends on the normal direction of the surface of target object 2 appearing in the pixel. Therefore, normal line image 20 (20X, 20Y) can accurately represent a distribution of the normal direction of the surface of target object 2.

A value of each pixel of normal line image 20 (20X, 20Y) may indicate a light emission position at which a luminance peaks in a waveform indicating a relationship between the luminance of the pixel and the light emission position in the plurality of captured images. As illustrated in FIG. 7, the light emission position at which a luminance peaks depends on the normal direction of the surface of target object 2. Therefore, normal line image 20 (20X, 20Y) can accurately represent a distribution of the normal direction of the surface of target object 2.

Image analysis unit 18 may further generate direct reflection images 22X and 22Y by analyzing the plurality of captured images. A value of each pixel of direct reflection images 22X and 22Y is amplitude A of a waveform indicating a relationship between a luminance of the pixel and the light emission position in the plurality of captured images.

By checking direct reflection images 22X and 22Y, it is possible to accurately detect a stain of a substance (for example, ink) that reduces a degree of regular reflection of light as illustrated in FIG. 10. Further, by checking direct reflection images 22X and 22Y, a fine flaw on the surface of target object 2 made of glass as illustrated in FIG. 12 can be accurately detected.

Light emitting device 10A includes a plurality of light sources 101, and sequentially switches the light source to emit light among the plurality of light sources 101. The plurality of light sources 101 are arranged on virtual plane 82 perpendicular to optical axis 80 of collimator lens 12. This allows light emitting device 10A to easily change the light emission position.

Image analysis unit 18 may further generate composite image 24 obtained by combining a plurality of captured images. By checking composite image 24, it is possible to accurately detect a defect such as low-contrast unevenness causing diffuse reflection, without being affected by irregularities on the surface of target object 2.

Note that image analysis unit 18 may generate at least one of normal line image 20 (20X, 20Y) or direct reflection images 22X and 22Y. That is, image analysis unit 18 generates an analysis image by analyzing a plurality of captured images obtained individually from a plurality of times of imaging where the light emission positions are different from each other. A value of each pixel of the analysis image (including at least one of normal line image 20 (20X, 20Y) or direct reflection images 22X and 22Y) is a feature quantity (including a phase and an amplitude) of a waveform indicating a relationship between a luminance of the pixel and the light emission position in a plurality of captured images.

<H. Modification>

In Specific Example 1 illustrated in FIG. 2, the plurality of light sources 101 included in light emitting device 10A are arranged in a matrix. However, the arrangement of the plurality of light sources 101 is not limited to a matrix.

Figure 20:
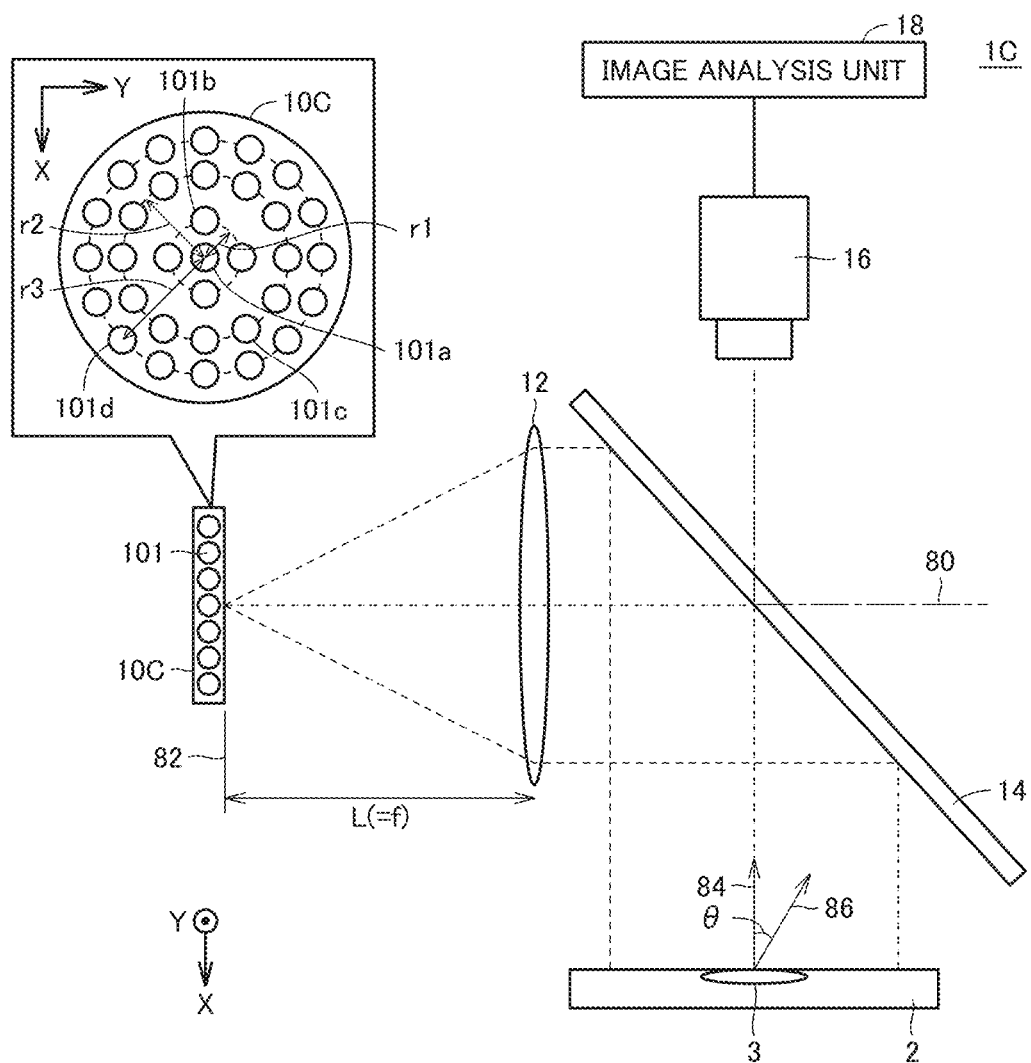
FIG. 20 is a diagram illustrating a configuration of an inspection system 1C according to Modification 1.

FIG. 20 is a diagram illustrating a configuration of an inspection system 1C according to Modification 1. As illustrated in FIG. 20, inspection system 1C includes a light emitting device 10C, collimator lens 12, half mirror 14, imaging device 16, and image analysis unit 18.

Light emitting device 10C includes a plurality of light sources 101 similarly to light emitting device 10A of Specific Example 1. The plurality of light sources 101 are arranged on virtual plane 82 perpendicular to optical axis 80 of collimator lens 12. Distance L between virtual plane 82 and collimator lens 12 coincides with focal distance f of collimator lens 12.

The plurality of light sources 101 are arranged along a circumferential direction. Specifically, the plurality of light sources 101 includes one light source 101a, four light sources 101b, 12 light sources 101c, and 16 light sources 101d. Light source 101a is located on optical axis 80 of collimator lens 12. The four light sources 101b are arranged at equal intervals along a circumference having a radius of r1 from optical axis 80. The 12 light sources 101c are arranged at equal intervals along a circumference having a radius r2 (>r1) from optical axis 80. The 16 light sources 101d are arranged at equal intervals along a circumference having a radius r3 (>r2) from optical axis 80.

Figure 21:
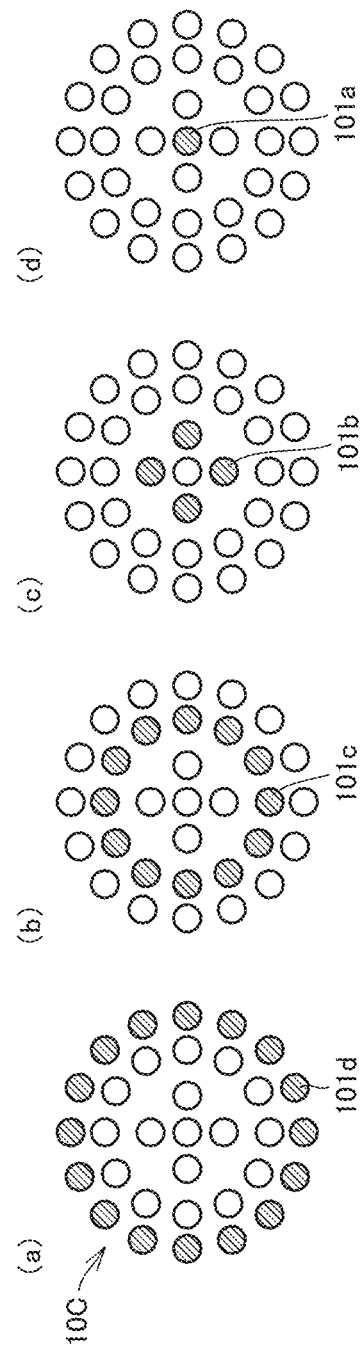

FIG. 21 is a view illustrating an example of four lighting states of light emitting device 10C. Light emitting device 10C sequentially switches among a first lighting state illustrated in FIG. 21(a), a second lighting state illustrated in FIG. 21(b), a third lighting state illustrated in FIG. 21(c), and a fourth lighting state illustrated in FIG. 21(d). The first lighting state is a state in which the 16 light sources 101d are simultaneously turned on. The second lighting state is a state in which the 12 light sources 101c are simultaneously turned on. The third lighting state is a state in which the four light sources 101b are simultaneously turned on. The fourth lighting state is a state in which light source 101a is turned on.

In four captured images obtained individually by imaging in the first to fourth lighting states, a lighting state in which a luminance of each pixel is maximized depends on an angle θ (see FIG. 20) formed by a normal direction 86 of a surface of target object 2 appearing in the pixel and optical axis 84 of imaging device 16. Therefore, a distribution of angle θ can be grasped by checking normal line image 20 generated from the four captured images.

In the example illustrated in FIGS. 2 and 20, the plurality of light sources 101 are arranged on virtual plane 82 perpendicular to optical axis 80 of collimator lens 12. In this case, a light beam is distorted due to a field curvature of collimator lens 12, which may affect analysis of the captured image. Therefore, the plurality of light sources 101 may be arranged on a spherical surface according to the field curvature of collimator lens 12.

Figure 22:
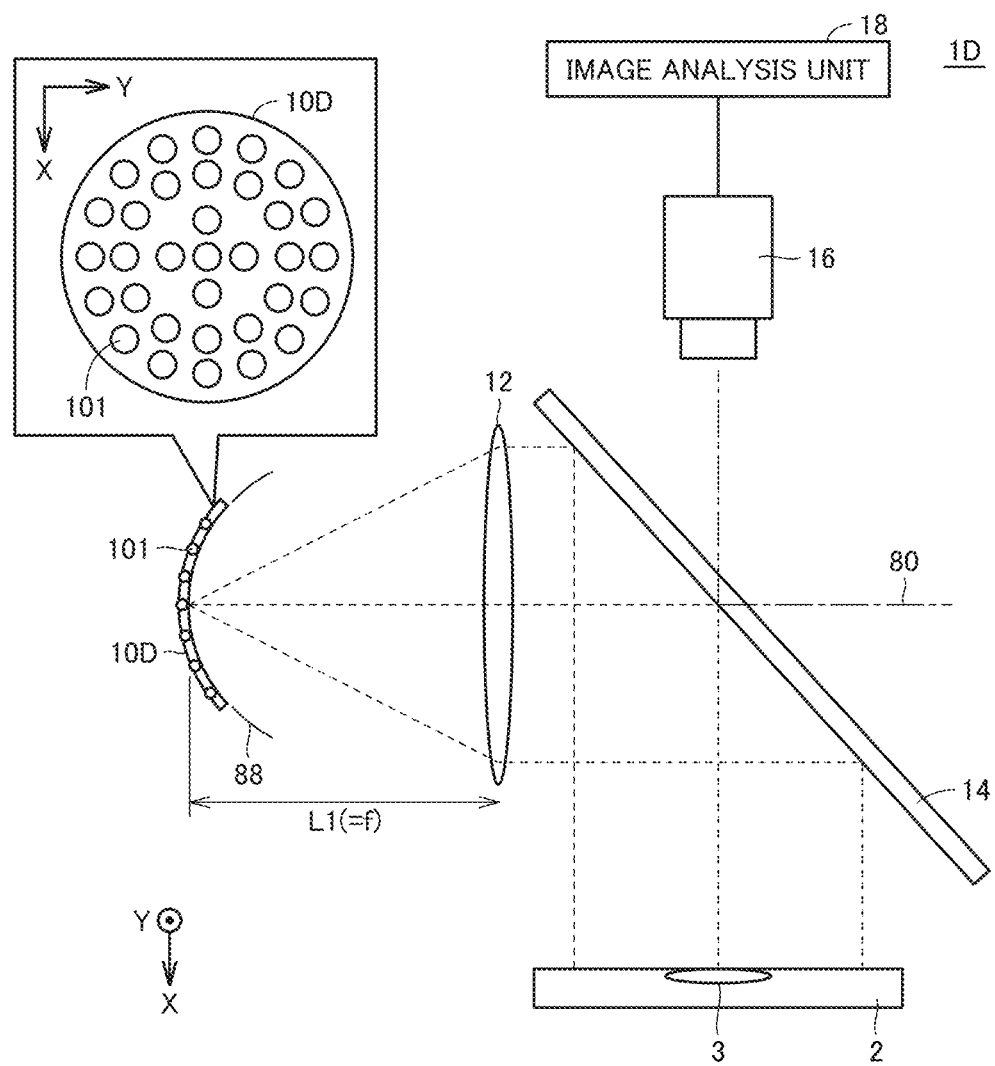
FIG. 22 is a diagram illustrating a configuration of an inspection system 1D according to Modification 2.

FIG. 22 is a diagram illustrating a configuration of an inspection system 1D according to Modification 2. As illustrated in FIG. 22, inspection system 1D includes a light emitting device 10D, collimator lens 12, half mirror 14, imaging device 16, and image analysis unit 18.

Light emitting device 10D includes a plurality of light sources 101 similarly to light emitting device 10C of Modification 1. However, the plurality of light sources 101 are arranged on a spherical virtual curved surface 88 having a center on optical axis 80 of collimator lens 12. A distance L1 between light source 101 located on optical axis 80 and collimator lens 12 is the same as focal distance f of collimator lens 12. A center and a radius of the sphere having virtual curved surface 88 as a surface are set according to the field curvature of collimator lens 12. As a result, it is possible to suppress an influence of distortion of a light beam caused by the field curvature of collimator lens 12.

In the example illustrated in FIGS. 2 and 20, distance L between light emitting device 10A or 10C and collimator lens 12 is set to be the same as focal distance f of collimator lens 12. However, distance L may be set to be larger than focal distance f.

Figure 23:
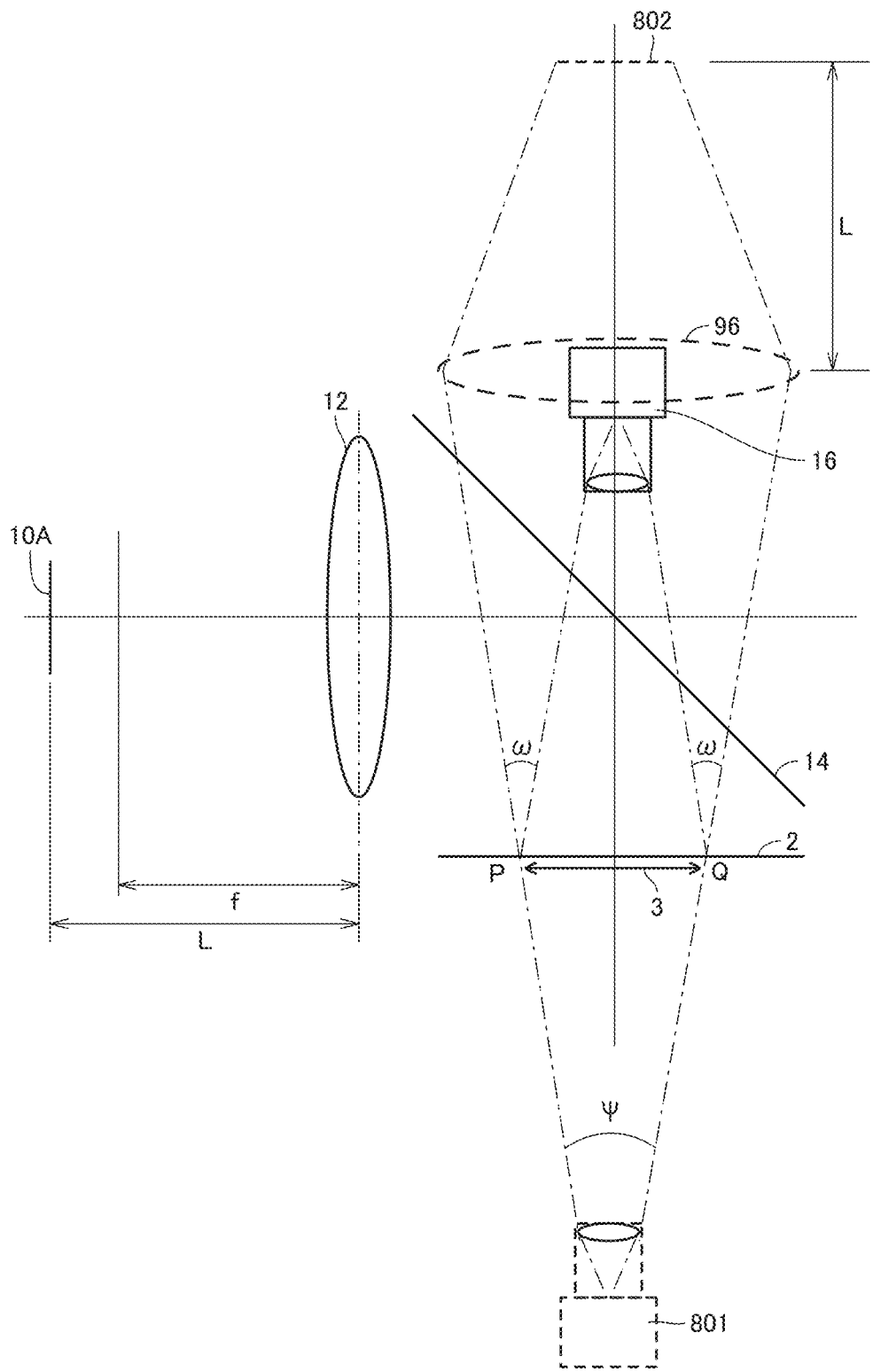
FIG. 23 is a view illustrating an optical path when a distance L between light emitting device 10A and a collimator lens 12 is set longer than a focal distance f of collimator lens 12.

FIG. 23 is a view illustrating an optical path when distance L between light emitting device 10A and collimator lens 12 is set longer than focal distance f of collimator lens 12. FIG. 23 also illustrates virtual image 96 of collimator lens 12, virtual image 802 of light emitting device 10A, and a virtual image 801 of imaging device 16. Collimator lens 12 and virtual image 96 are symmetric with respect to half mirror 14. Light emitting device 10 and virtual image 802 are symmetric with respect to half mirror 14. Imaging device 16 and virtual image 801 are symmetric with respect to a plane (an inspection plane) including inspection target region 3 of target object 2.

As illustrated in FIG. 23, distance L between light emitting device 10A and collimator lens 12 is adjusted such that irradiation solid angle ω at each point of inspection target region 3 coincides with an observation solid angle Ψ of imaging device 16. As a result, even if a distance between imaging device 16 and target object 2 is changed (that is, even when imaging device 16 is brought close to target object 2), a state is maintained in which the light emission position at which a luminance peaks is the same at all points between end points P and Q of inspection target region 3. As a result, an error in normal line images 20X and 20Y can be reduced.

§ 3. Supplementary Note

As described above, the present embodiment includes the disclosure as follows.

(Configuration 1)

An inspection system (1, 1A to 1D) for inspecting a surface of a target object (2), the inspection system (1, 1A to 1D) including:
- a light emitting device (10, 10A to 10D) configured to illuminate the target object (2);
- a collimator lens (12) arranged between the light emitting device (10, 10A to 10D) and the target object (2); and
- an imaging device (16) configured to image the target object (2),
- wherein the light emitting device (10, 10A to 10D) is capable of changing a light emission position, and
- the inspection system (1, 1A to 1D) further includes:
- an image analysis unit (18) configured to generate a first analysis image (20, 20X, 20Y) in which a value of each pixel corresponds to a normal direction of a surface of the target object (2) appearing in the pixel, by analyzing a plurality of captured images obtained individually from a plurality of times of imaging where the light emission positions are different from each other.

(Configuration 2)

The inspection system (1, 1A to 1D) according to Configuration 1, wherein a value of each pixel of the first analysis image (20, 20X, 20Y) indicates a phase of a waveform indicating a relationship between a luminance of the pixel and the light emission position in the plurality of captured images.

(Configuration 3)

The inspection system (1, 1A to 1D) according to Configuration 1, wherein a value of each pixel of the first analysis image (20, 20X, 20Y) indicates the light emission position at which a luminance peaks in a waveform indicating a relationship between the luminance of the pixel and the light emission position in the plurality of captured images.

(Configuration 4)

The inspection system (1, 1A to 1D) according to Configuration 1, wherein
- the image analysis unit (18) further generates a second analysis image (22X, 22Y) by analyzing the plurality of captured images, and
- a value of each pixel of the second analysis image (22X, 22Y) is an amplitude of a waveform indicating a relationship between a luminance of the pixel and the light emission position in the plurality of captured images.

(Configuration 5)

The inspection system (1, 1A, 1C, 1D) according to any one of Configurations 1 to 4, wherein
- the light emitting device (10, 10A, 10C, 10D) includes a plurality of light sources (101, 101a to 101d), and sequentially switches a light source to emit light among the plurality of light sources (101, 101a to 101d), and the plurality of light sources (101, 101a to 101d) are arranged on a plane (82) perpendicular to an optical axis (80) of the collimator lens (12) or on a spherical surface (88) centered on the optical axis (80).

(Configuration 6)

The inspection system (1, 1A to 1D) according to any one of Configurations 1 to 5, wherein the image analysis unit (18) further generates a composite image (24) obtained by combining the plurality of captured images.

(Configuration 7)

The inspection system (1, 1A to 1D) according to any one of Configurations 1 to 6, wherein a distance between the light emission position and the collimator lens (12) is greater than or equal to a focal distance of the collimator lens (12).

(Configuration 8)

The inspection system (1, 1A to 1D) according to any one of Configurations 1 to 7, further including:
- a half mirror (14) arranged between the collimator lens (12) and the target object (2),
- wherein light emitted from the light emitting device (10, 10A to 10D) and transmitted through the collimator lens (12) is reflected by the half mirror (14) to illuminate the target object (2), and
- light reflected by the target object (2) is transmitted through the half mirror (14) to be incident on the imaging device (16).

(Configuration 9)

An inspection system (1, 1A to 1D) for inspecting a surface of a target object (2), the inspection system (1, 1A to 1D) including:
- a light emitting device (10, 10A to 10D) configured to illuminate the target object (2);
- a collimator lens (12) arranged between the light emitting device (10, 10A to 10D) and the target object (2); and
- an imaging device (16) configured to image the target object,
- wherein the light emitting device (10, 10A to 10D) is capable of changing a light emission position,
- the inspection system (1, 1A to 1D) further includes:
- an image analysis unit (18) configured to generate an analysis image by analyzing a plurality of captured images obtained individually from a plurality of times of imaging where the light emission positions are different from each other, and
- a value of each pixel of the analysis image is a feature quantity of a waveform indicating a relationship between a luminance of the pixel and the light emission position in the plurality of captured images.

(Configuration 10)

An inspection method for inspecting a surface of a target object (2), the inspection method including:
- imaging the target object (2) while irradiating the target object (2) with light emitted from a light emitting device (10, 10A to 10D) and transmitted through a collimator lens (12),
- wherein the imaging includes:
- switching a light emission position in the light emitting device (10, 10A to 10D); and
- acquiring a plurality of captured images from a plurality of times of imaging where the light emission positions are different from each other, and
- the inspection method further includes:
- generating an analysis image (20, 20X, 20Y) in which a value of each pixel corresponds to a normal direction of a surface of the target object (2) appearing in the pixel, by analyzing the plurality of captured images.

Although the embodiment of the present invention has been described, it should be considered that the embodiment disclosed herein is illustrative in all respects and not restrictive. The scope of the present invention is defined by the claims, and it is intended to include all modifications within the meaning and scope equivalent to the claims.

REFERENCE SIGNS LIST 1, 1A to 1D: inspection system, 2: target object, 3: inspection target region, 5: display device, 6: memory card, 7: input device, 10, 10A to 10D: light emitting device, 12: collimator lens, 14: half mirror, 16: imaging device, 18: image analysis unit, 20, 20X, 20Y: normal line image, 21X, 21Y: differential image, 22X, 22Y: direct reflection image, 23X, 23Y: image, 24: composite image, 25: irregularity image, 26: binary image, 28: difference image, 50, 51, 52: pixel, 60, 62: frame line, 80, 84: optical axis, 82: virtual plane, 86: normal direction, 88: virtual curved surface, 90, 92: luminous flux, 94: region, 96, 801, 802: virtual image, 101, 101a to 101d, 102: light source, 103: XY stage, 180: processor, 181: RAM, 182: display controller, 183: system controller, 184: I/O controller, 185: hard disk, 186: camera interface, 187: input interface, 189: communication interface, 190: memory card interface, 191: analysis program, F, F1: defect, L, L1: distance, LA, LB, LC: light, P, Q: end point, PA, PB, PC: light emission position

The invention claimed is:

1. An inspection system for inspecting a surface of a target object, the inspection system comprising:
a light emitting device configured to illuminate the target object;
a collimator lens arranged between the light emitting device and the target object; and
an imaging device configured to image the target object,
wherein the light emitting device is capable of emitting light at any light emission position selected from a plurality of light emission positions,
wherein the inspection system further comprises:
a processor; and
a memory storing computer-executable instructions that, when executed by the processor, cause the processor to perform operations including:
analyzing a plurality of captured images obtained individually from a plurality of times of imaging where the plurality of light emission positions are different from each other; and
generating at least one of a first analysis image or a second analysis image,
wherein a value of each pixel of the first analysis image indicates a particular light emission position of the plurality of light emission positions, the particular light emission position indicated by a target pixel has been selected when capturing a particular image in which a pixel at the same coordinate as the target pixel has greater luminance than a pixel at the same coordinate as the target pixel in any other image of the plurality of captured images, and
wherein a value of each pixel of the second analysis image is an amplitude of a waveform indicating a relationship between a luminance of the pixel and the light emission position in the plurality of captured images.

2. The inspection system according to claim 1, wherein the light emitting device includes a plurality of light sources, and sequentially switches a light source to emit light among the plurality of light sources, and
the plurality of light sources are arranged on a plane perpendicular to an optical axis of the collimator lens or on a spherical surface centered on the optical axis.

3. The inspection system according to claim 1, wherein the operations further include generating a composite image obtained by combining the plurality of captured images.

4. The inspection system according to claim 1, wherein a distance between the light emission position and the collimator lens is greater than or equal to a focal distance of the collimator lens.

5. The inspection system according to claim 1, further comprising a half mirror arranged between the collimator lens and the target object,
wherein light emitted from the light emitting device and transmitted through the collimator lens is reflected by the half mirror to illuminate the target object, and
light reflected by the target object is transmitted through the half mirror to be incident on the imaging device.

6. An inspection method for inspecting a surface of a target object, the inspection method comprising:
imaging the target object while irradiating the target object with light emitted from a light emitting device and transmitted through a collimator lens,
wherein the imaging includes:
selecting, from a plurality of light emission positions, a light emission position in the light emitting device; and
acquiring a plurality of captured images from a plurality of times of imaging where the plurality of light emission positions are different from each other,
wherein the inspection method further comprises:
analyzing the plurality of captured images; and
generating at least one of a first analysis image or a second analysis image,
wherein a value of each pixel of the first analysis image indicates a particular light emission position of the plurality of light emission positions, the particular light emission position indicated by a target pixel has been selected when capturing a particular image in which a pixel at the same coordinate as the target pixel has greater luminance than a pixel at the same coordinate as the target pixel in any other image of the plurality of captured images, and
wherein a value of each pixel of the second analysis image is an amplitude of a waveform indicating a relationship between a luminance of the pixel and the light emission position in the plurality of captured images.

7. The inspection method according to claim 6, wherein the light emitting device includes a plurality of light sources, the plurality of light sources being arranged on a plane perpendicular to an optical axis of the collimator lens or on a spherical surface centered on the optical axis, and
the switching includes sequentially switching a light source to emit light among the plurality of light sources.

8. The inspection method according to claim 6, further comprising:
generating a composite image obtained by combining the plurality of captured images.

9. The inspection method according to claim 6, wherein a distance between the light emission position and the collimator lens is greater than or equal to a focal distance of the collimator lens.

10. The inspection method according to claim 6, further comprising:
arranging a half mirror between the collimator lens and the target object, wherein the imaging includes:
illuminating the target object with the light by reflecting the light by the half mirror; and allowing light reflected by the target object to be transmitted through the half mirror to be incident on an imaging device.

\* \* \* \* \*